(12) United States Patent
Stancu

(10) Patent No.: US 11,618,316 B2
(45) Date of Patent: Apr. 4, 2023

(54) LOCKABLE CAP ASSEMBLY FOR A FUEL FILLER PIPE

(71) Applicant: Martinrea International US Inc., Auburn Hills, MI (US)

(72) Inventor: Sorin Stancu, Dearborn, MI (US)

(73) Assignee: Martinrea International US Inc., Auburn Hills, MI (US)

( * ) Notice: Subject to any disclaimer, the term of this patent is extended or adjusted under 35 U.S.C. 154(b) by 24 days.

(21) Appl. No.: 17/227,970

(22) Filed: Apr. 12, 2021

(65) Prior Publication Data

US 2021/0229547 A1   Jul. 29, 2021

Related U.S. Application Data

(62) Division of application No. 16/417,855, filed on May 21, 2019, now Pat. No. 11,040,614.

(60) Provisional application No. 62/674,949, filed on May 22, 2018.

(51) Int. Cl.
    *B60K 15/04* (2006.01)
    *E05B 83/34* (2014.01)

(52) U.S. Cl.
    CPC ...... *B60K 15/0409* (2013.01); *B60K 15/0406* (2013.01); *E05B 83/34* (2013.01); *B60K 2015/0435* (2013.01); *Y10T 292/084* (2015.04)

(58) Field of Classification Search
    CPC ............ B60K 15/0409; B60K 15/0406; B60K 2015/0435; E05B 83/34; E05B 83/28; E05B 73/00; E05B 73/0017; E05B 73/0041; Y10T 292/084; Y10T 70/5562; Y10T 70/5571; Y10T 70/5575; Y10T 70/558; Y10T 70/5584; Y10T 70/5589; Y10T 70/5593; Y10T 70/5597; Y10T 70/5602; Y10T 70/5606; B65D 50/067; B65D 50/06; B65D 55/14
    USPC ..................... 220/210, 325, 324, 327, 315
    See application file for complete search history.

(56) References Cited

U.S. PATENT DOCUMENTS

| | | | | |
|---|---|---|---|---|
| 1,968,506 | A | * 7/1934 | Schneider | .......... B60K 15/0409 70/168 |
| 2,006,748 | A | * 7/1935 | Ritz-Woller | ....... B60K 15/0406 220/86.3 |
| 3,151,756 | A | * 10/1964 | Gruen | .................... B65D 55/14 70/168 |
| 3,998,353 | A | 12/1976 | Farelli | |
| 4,132,091 | A | 1/1979 | Aro et al. | |
| 6,968,874 | B1 | 11/2005 | Gabbey et al. | |
| 8,382,187 | B2 | 2/2013 | Guendouz et al. | |
| 8,430,140 | B2 | 4/2013 | Ognjanovski et al. | |

(Continued)

*Primary Examiner* — Rafael A Ortiz
*Assistant Examiner* — Sanjidul Islam
(74) *Attorney, Agent, or Firm* — Dinsmore & Shohl LLP

(57) ABSTRACT

A lockable assembly for a fuel filler pipe including a cap supported upon a unit mounted to the fuel filler pipe. The clip has at least one locking tab which is actuated by a key insertable portion incorporated into the cap and in order to lock or unlock the cap for removal from the outside part of the unit attached to the filler pipe. The key insertable portion can further include a rotatable component. The at least one locking tab further includes a pair of locking tabs which are radially displaced via the rotatable component so that the tabs displace in opposite directions. Other features include a sliding limiter component associated with each of the oppositely directed locking tabs.

16 Claims, 20 Drawing Sheets

(56) References Cited

U.S. PATENT DOCUMENTS

| | | |
|---|---|---|
| 10,000,117 B2 | 6/2018 | Giles et al. |
| 2008/0022732 A1* | 1/2008 | McCarthy .......... B60K 15/0409 70/167 |
| 2008/0087354 A1 | 4/2008 | Cisternino et al. |
| 2011/0079322 A1 | 4/2011 | Beier et al. |
| 2012/0217240 A1* | 8/2012 | Dutzi ................ B60K 15/0406 220/86.2 |
| 2014/0332529 A1* | 11/2014 | Ryu ...................... B60K 15/04 220/86.2 |

* cited by examiner

LOCKABLE CAP ASSEMBLY FOR A FUEL FILLER PIPE

CROSS REFERENCE TO RELATED APPLICATIONS

The present application is a divisional of U.S. Ser. No. 16/417,855, filed May 21, 2019. The '855 application claims the priority of U.S. Ser. No. 62/674,949 filed May 22, 2018.

FIELD OF THE INVENTION

The present application is a lockable cap assembly for fuel filler pipe which can incorporate either of a toothed gear assembly or an elliptical cam/groove profile, in either instance including any number of locking tabs (such as a pair arranged in opposite directions) and which are radially displaced between inner engaged and outer released positions relative to an underside supporting surface of a fixed unit secured to the fuel filler pipe and upon which the cap is supported. In certain variants, the extent of displacement of the locking tabs can also be controlled by a sliding limiter component associated with each oppositely directed locking tab, and in order to lock or unlock a rotatable portion of the cap for removal from the outside part of the capless unit integrated into the filler pipe.

BACKGROUND OF THE RELEVANT ART

The prior art is documented with examples of capless and other type of fuel filler pipe locking assemblies, such as which are provided in order to prevent mischief including theft of gas. Examples of existing designs include the lockable plug for a capless fuel tank filler neck of McCarthy, US 2008/0022732. Also noted is the capless fuel filling system of Ognjanvoski, U.S. Pat. No. 8,430,140, which includes a closure assembly that form an iris arrangement that is rotatable to form a seal for a fuel filling tube or to provide access to the fuel filling tube.

Other examples of note include the filler conduit security cap of Farelli, U.S. Pat. No. 3,998,353, which includes a lock body with a key operable latch and upper face receiving key slot. The lock body is accommodated within the upper end of the filler conduit and locked in place beneath the conventional screw cover of the conduit.

Aro et al., U.S. Pat. No. 4,132,091, teaches a self locking fuel cap for threaded engagement with a vehicle fuel tank inlet in which a locking mechanism employs a key to move a lug from a stable locking position to an unstable unlocking position. The key may be immediately removed and the fuel cap may be threadably disengaged from the inlet and thereafter reengaged therewith once fuel has been introduced into the tank.

The key need not he employed to lock the fuel cap, since once manipulation of the fuel cap to threadably engage the cap with the fuel inlet is initiated, the lug is moved from the unstable unlocking position to a stable locking position. The cap may thereafter not be threadably disengaged from the fuel tank inlet unless a key is employed to again shift the lug to the unstable unlocking position. A clutch mechanism is employed to prevent overtightening of the cap and consequent damage to the cap or fuel tank inlet, yet allow sufficient tightening to effectuate a vapor tight seal between the cap and the inlet.

SUMMARY OF THE PRESENT INVENTION

The present invention teaches a lockable assembly for a fuel filler pipe, the lockable assembly including a cap supported upon a passageway interior defining unit mounted to the fuel filler pipe. The cap has at least one locking tab which is actuated by a key insertable portion incorporated into the cap and in order to lock or unlock the cap for removal from the outside part of the unit attached to the end of the filler pipe.

The key insertable portion further includes a gear assembly. The at least one locking tab further includes a pair of locking tabs which are radially displaced via a central rotatable gear incorporated into the gear assembly so that the tabs displace in opposite directions. Other features include a sliding limiter component associated with each of the oppositely directed locking tabs.

A further variant of the present invention substitutes the gear assembly in favor of an elliptical cam mechanism, and by which the locking tabs are redesigned with downward projections at their inner ends which seat within a circumferential groove formed in the centrally positioned elliptical and key rotatable component. In this fashion, and upon the user rotatably engaging a reconfiguration of the key insertable portion, the elliptical component is rotated a determined angular offset such as ninety degrees, causing the inner end projections of the locking tabs to displace laterally outwardly from their inner engaged to outer released positions relative to an underside supporting surface associated with the fixed unit secured to the end of the filler pipe, and to again permit removal of the cap.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses a locking mechanism incorporated into a cap portion of a unit mounted to an open end of a fuel filler pipe for, among other objectives, deterring fuel theft or other mischief. As will be further described with reference to the attached illustrations, the cap portion includes, in one non-limiting variant, a pair of radially displacing locking tabs via a key operated rotatable gear. In another (FIGS. 27-31) the rotatable gear is substituted by a key operated elliptical cam. In either variant, the tabs actuate between a first inwardly retracted and locking condition in which the cap is secured to a base unit which is mounted to the fuel filler pipe, and a second outwardly expanded position in which inwardly turned outer edges of the tabs are displaced out of contact with annular locations of the mounted unit and, in so doing, permit the cap to be removed from the fixed unit and the filler pipe opening.

As will be further described, the present invention completes variants in which the cap can be directly/axially slid out of contact with the outside part/piece of the capless insert. It is also understood that additional related variants contemplate the cap and/or or capless insert being reconfigured so that the capless unit can also rotate and/or displace in some additional manner in order to separate from the capless unit/filler pipe.

Figure 1:
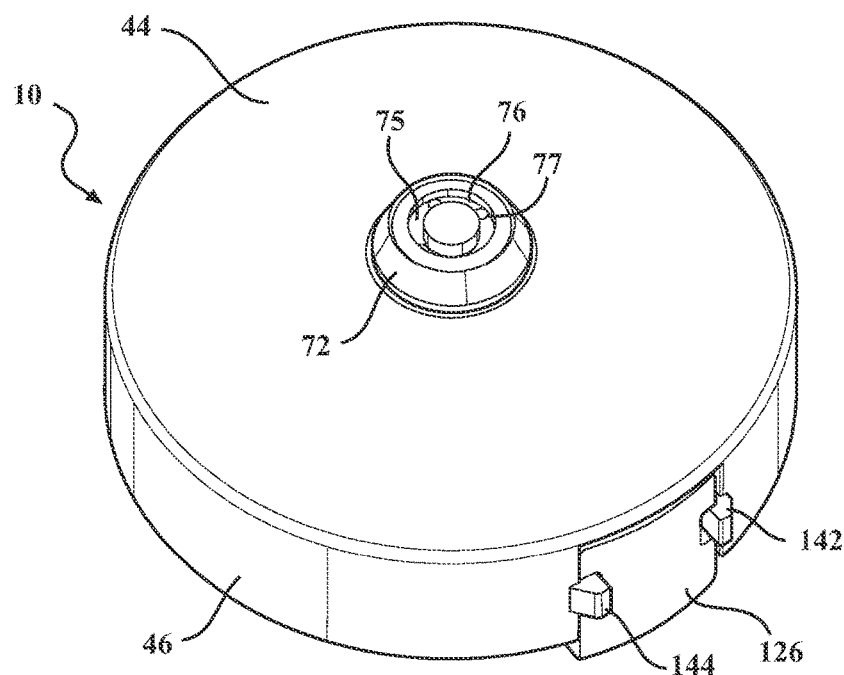
FIG. 1 is a perspective illustration of the capless unit with locking mechanism according to the present invention.

Referring to FIG. 1, a perspective illustration is generally shown at 10 of a cap portion which is mounted to a capless mounting unit which is further generally shown at 12 in each of FIGS. 2-4, 11-12, 16 and 18-20. The capless unit 12 (also termed a base or fixed portion of the assembly) is in turn secured to a fuel fill pipe 14 (see each of FIGS. 16-20). As best shown in the lengthwise cutaway of FIG. 20, the fill pipe 14 includes a turned flange or end (depicted as outwardly turned annular end 16 in FIG. 20) which provides a support for the base mounting unit (or capless unit) 12. The overall lockable assembly including the cap 10 and capless base/pipe mounting unit 12 can, without limitation, each be constructed of a material not limited to any of metal, metal alloys, fiberglass, plastic reinforced plastic/plastic composites and combinations thereof.

Figure 18:
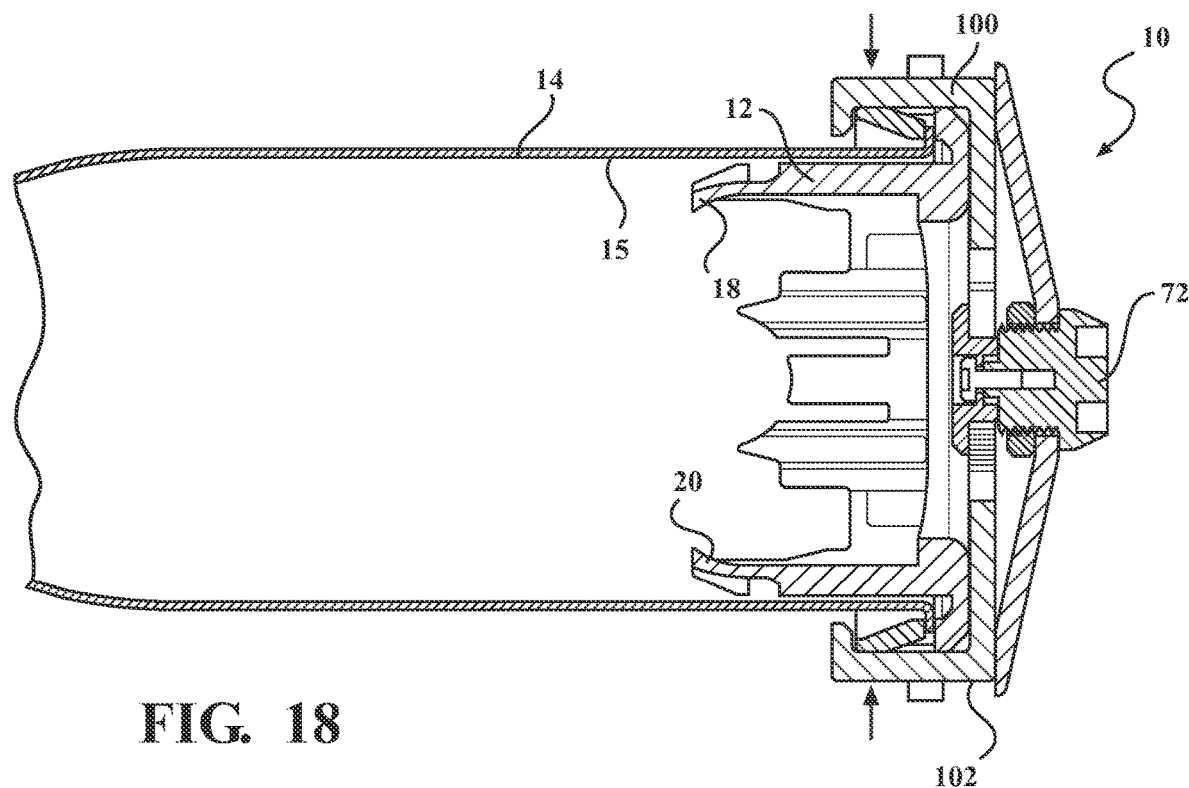
FIG. 18 is a side cutaway view of the assembled locking cover in engagement of the capless filler pipe in the closed/locked position.
Figure 19:
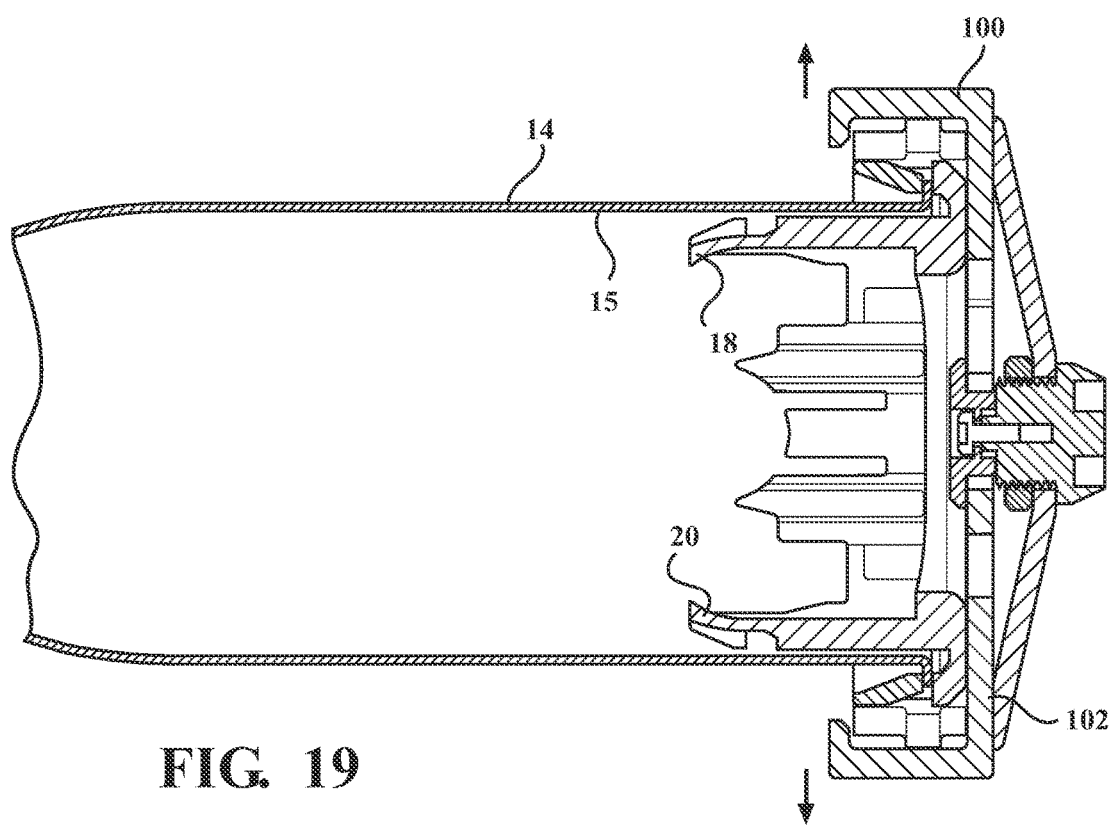
FIG. 19 is a succeeding side cutaway view similar to FIG. 18 and showing the locking cover displaced into the open/unlocked position.
Figure 20:
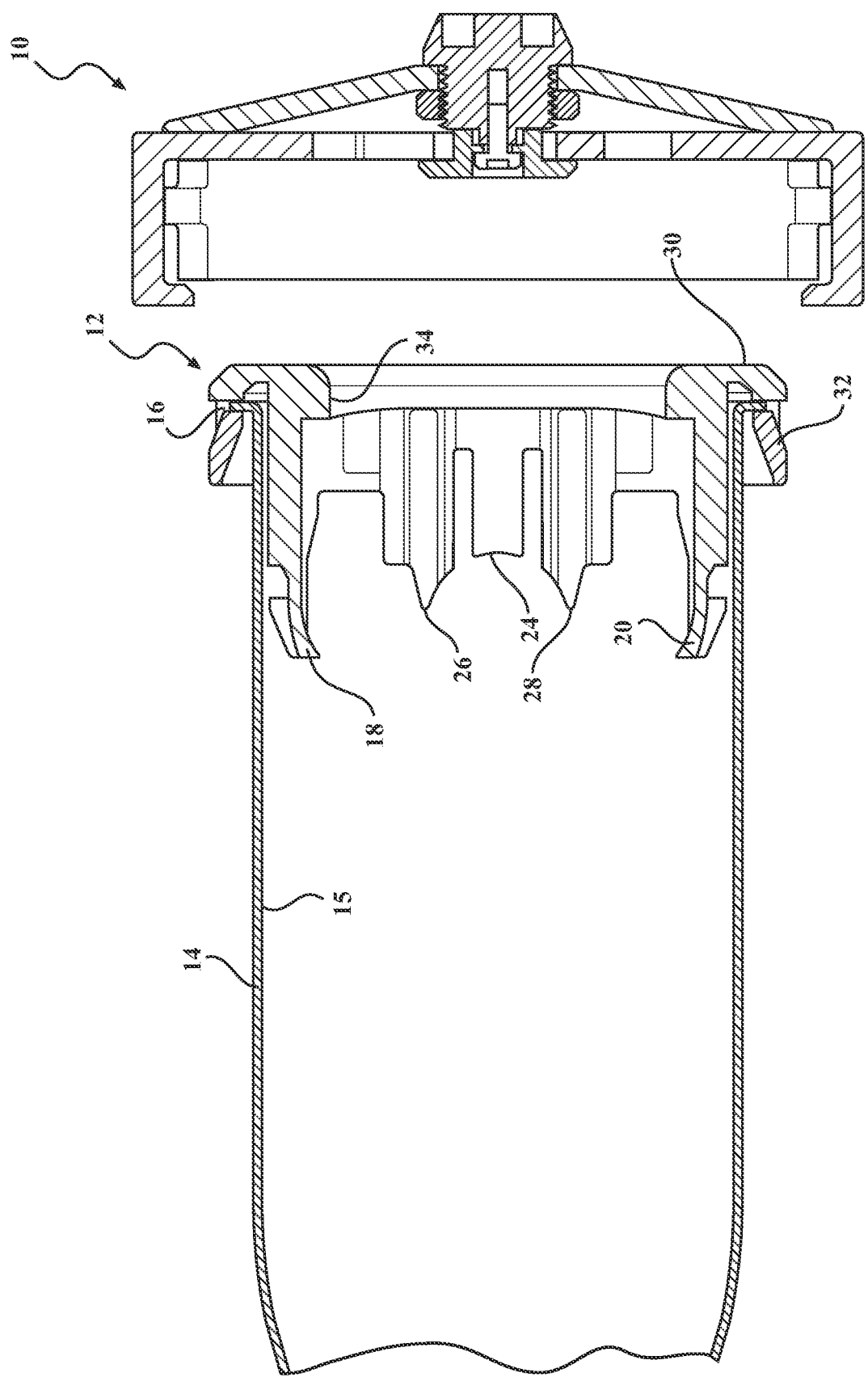
FIG. 20 is a cutaway exploded illustration of the locking cover removed from the filler pipe/capless unit.
Figure 21:
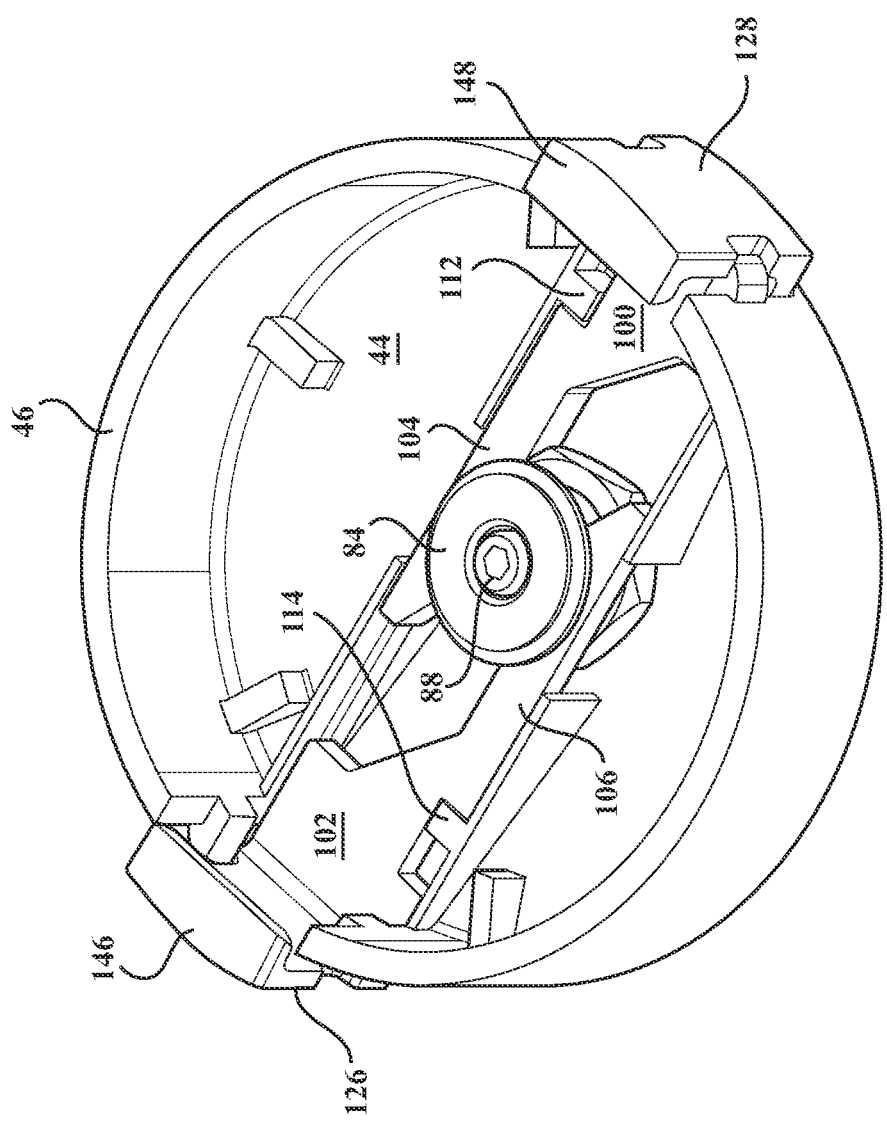
FIG. 21 is an underside perspective view of the cap portion previously shown in FIG. 13 in a further rotated position.
Figure 22:
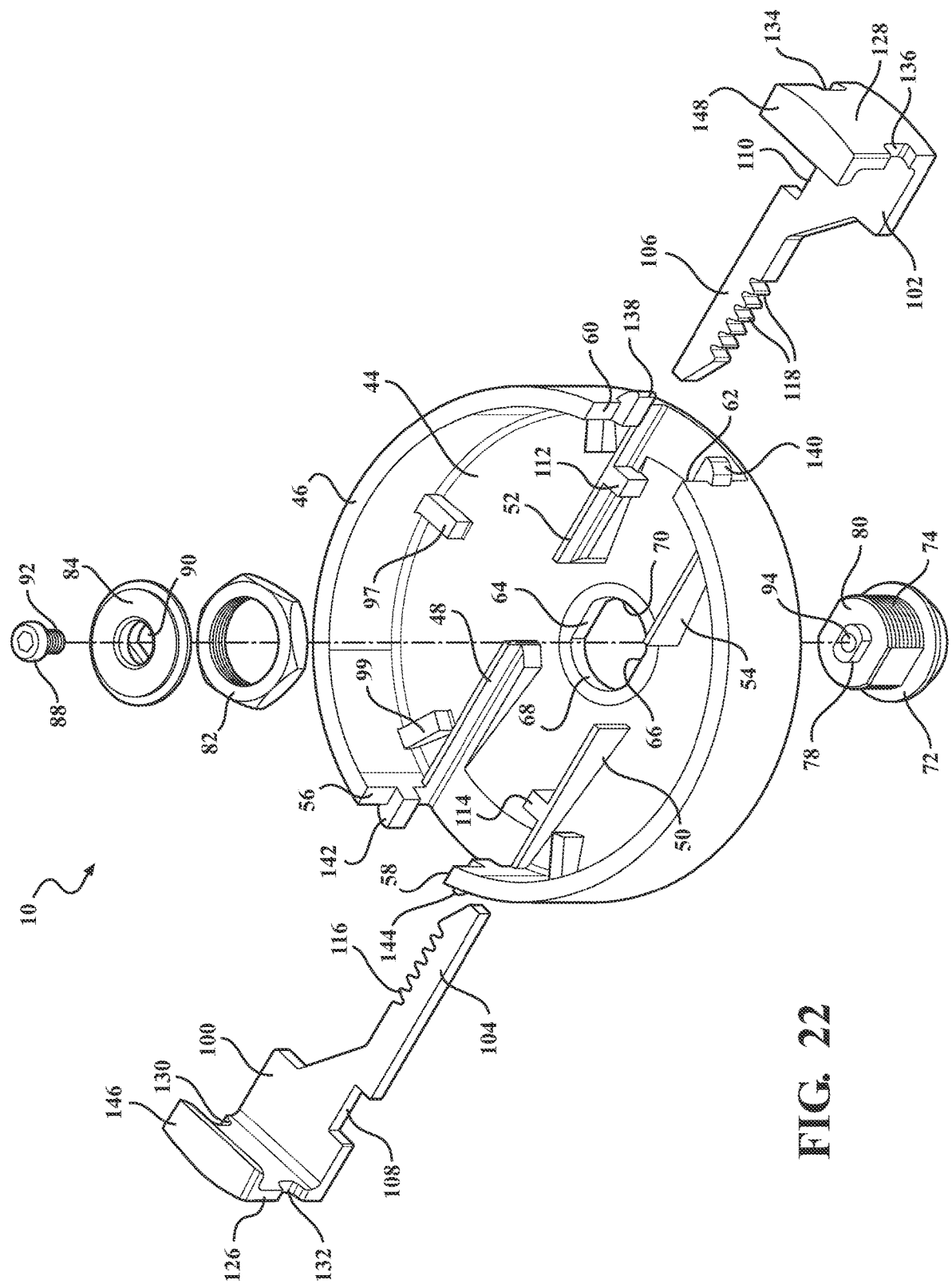
FIG. 22 is an exploded view of the cap portion with locking mechanism depicted in FIG. 21.

As shown, the capless unit 12 is depicted as an annular body having a plurality of biasing legs, these including a larger pair of legs 18 and 20 in combination with a collection of smaller tangs 22/24 and 26/28 (see again FIGS. 2 and 20) extending from annular locations of said unit and adapted to engage inside circumferential wall locations of the fuel filler pipe 4, and as is further best shown with reference to cutaway views FIGS. 18-20.

Figure 16:
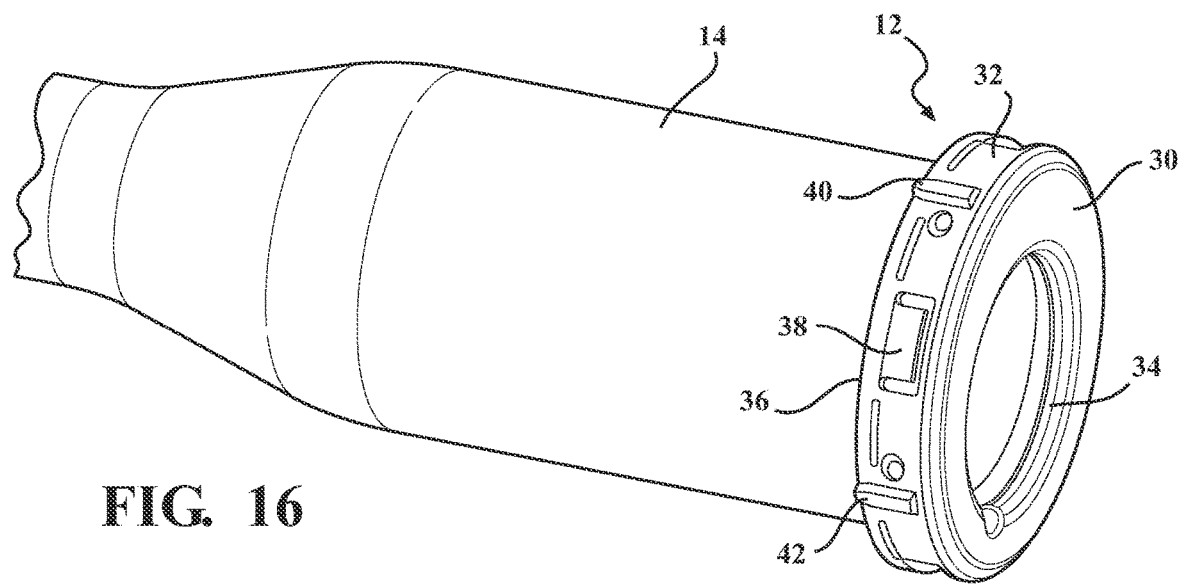
FIG. 16 is a perspective illustration of a filler pipe with the integrated capless unit.

The pipe 14 (such as which can include a plastic or metal which is constructed to resist degradation in response to prolonged contact with a combustible fuel) includes an inner diameter wall (see at 15 in FIGS. 18-20) which is dimensioned to receive the capless insert (not shown), in an inwardly installed and biasing arrangement so that an outer annular portion of the capless unit 12, this further represented in FIGS. 16 and 20 by end wall 30 and angled side wall 32 overlapping the annular outer surface of the pipe 14, see also as shown in FIG. 16, so that the capless base unit 12 of the assembly secures against the open end of the fill pipe 14 in such a manner that a central opening (see annular inner perimeter 34 in FIGS. 16 and 20) provides necessary clearance for receiving a fill nozzle (not shown) associated with a gas pump and upon removal of the cap 10 with locking mechanism.

Figure 3:
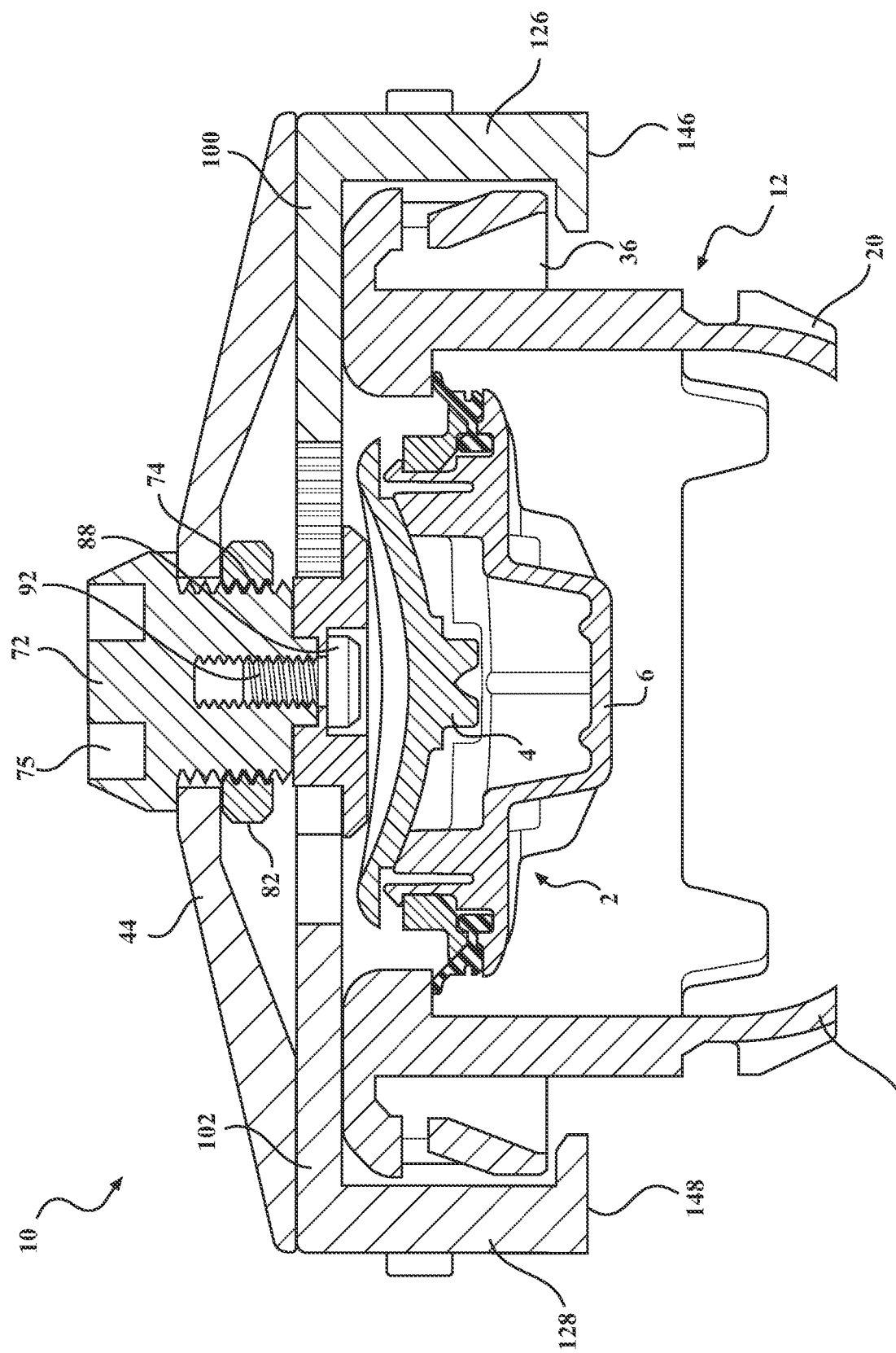
FIG. 3 is cutaway of the unit in FIG. 2 and illustrating the pair of gear driven locking tabs in inwardly displaced locked position relative to a fixed portions of the annular support structure for the capless unit.
Figure 4:
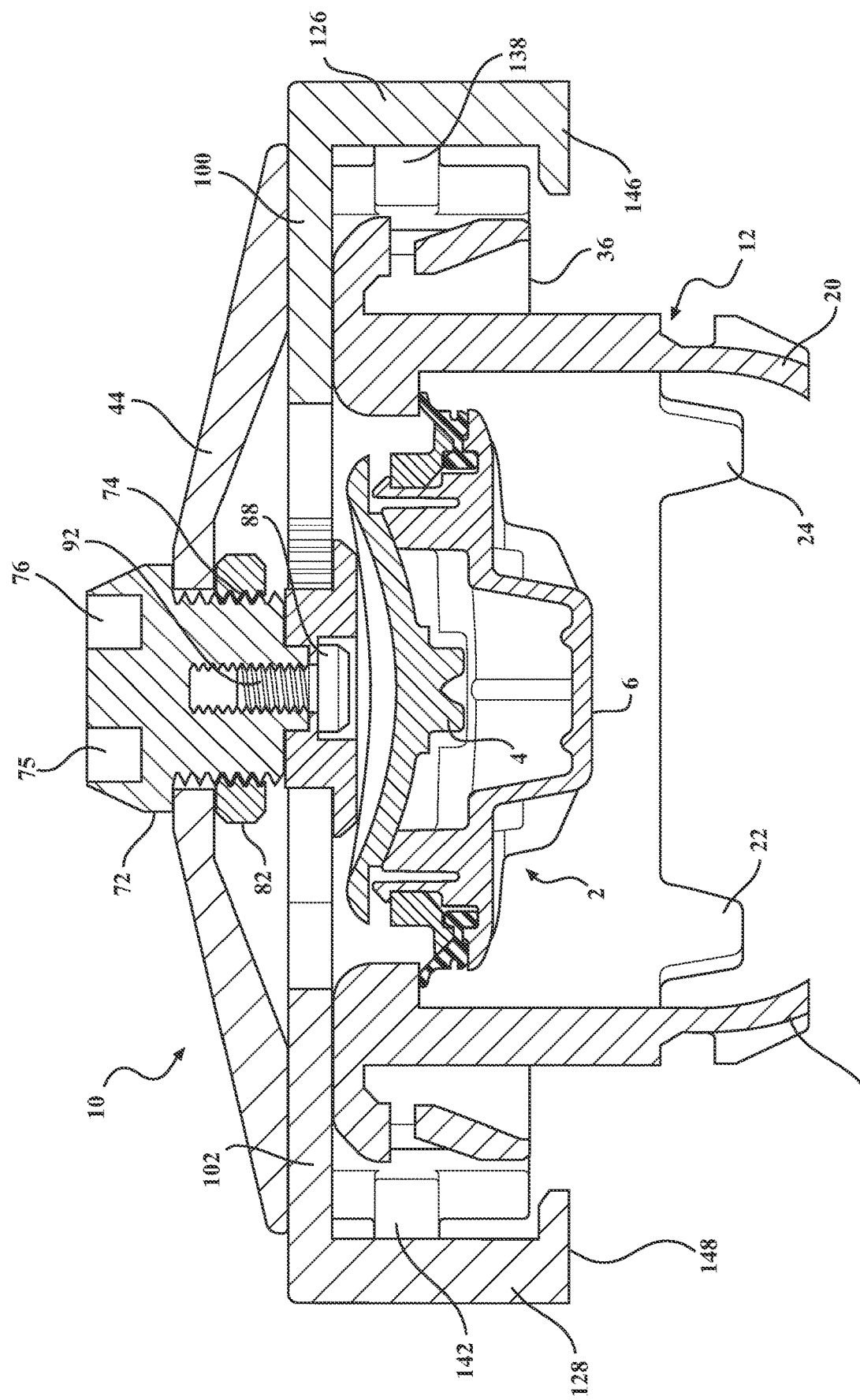
FIG. 4 is a successive illustration to FIG. 3 and illustrating the locking tabs outwardly displaced to an unlocked position, thereby permitting removal of the cap integrating the locking mechanism from the support structure mounted to the fuel filler pipe.

With additional reference to the plan cutaway views of FIGS. 3-4, the interior of the unit 12 attached to the fuel filler pipe 14 (again FIG. 14 et seq.) further displays a known type of closure subassembly, collectively depicted at 2, which forms no part of the claimed invention however which is understood to include any of a fixed, depressible or otherwise actuated flap or seal (see further at 4). A fuel nozzle (not shown) is inserted within the unit 12 to pierce or deflect the flap or seal 4 and which further can be directed through a lower guiding location 6 of the interior closure subassembly 2 in order to properly locate and receive a correctly sized fuel nozzle during filling. As a corollary objecting the guiding and receiving aspects of the closure subassembly 2 are further understood to prevent admission of an incorrectly dimensioned fuel nozzle (e.g. a diesel fill nozzle having a relatively larger sized dimension than for unleaded gas, and when attempted to be inserted within the unit).

As will be further described in reference to the present illustrations, an underside annular rim edge 36 of the outer annular portion (see in FIGS. 2-4, 11-12 and 16 adjoining the side wall 32 of the capless unit 12) is configured in combination with additional engagement locations located on the exterior side wall 32 of the capless unit outer portion, one of these shown at 38 in FIG. 16 and constituting a receiving track for seating an extending portion of each locking tab associated with the cap (to be further described). As further best shown in FIG. 16, and additional arrangement of lateral projections 40, 42, et seq., are provided upon the outer projecting side wall 32 of the capless unit 12, these coacting with opposing inside surface locations configured into the cap 10 (shown assembled over the unit 12 in succeeding FIG. 17) and so that, and upon displacing the locking tabs out of contact with the unit 12, the cap 10 can be axially removed to reveal the exposed open end of the fill pipe 14 (FIG. 20) for accessing by a suitable nozzle.

Figure 23:
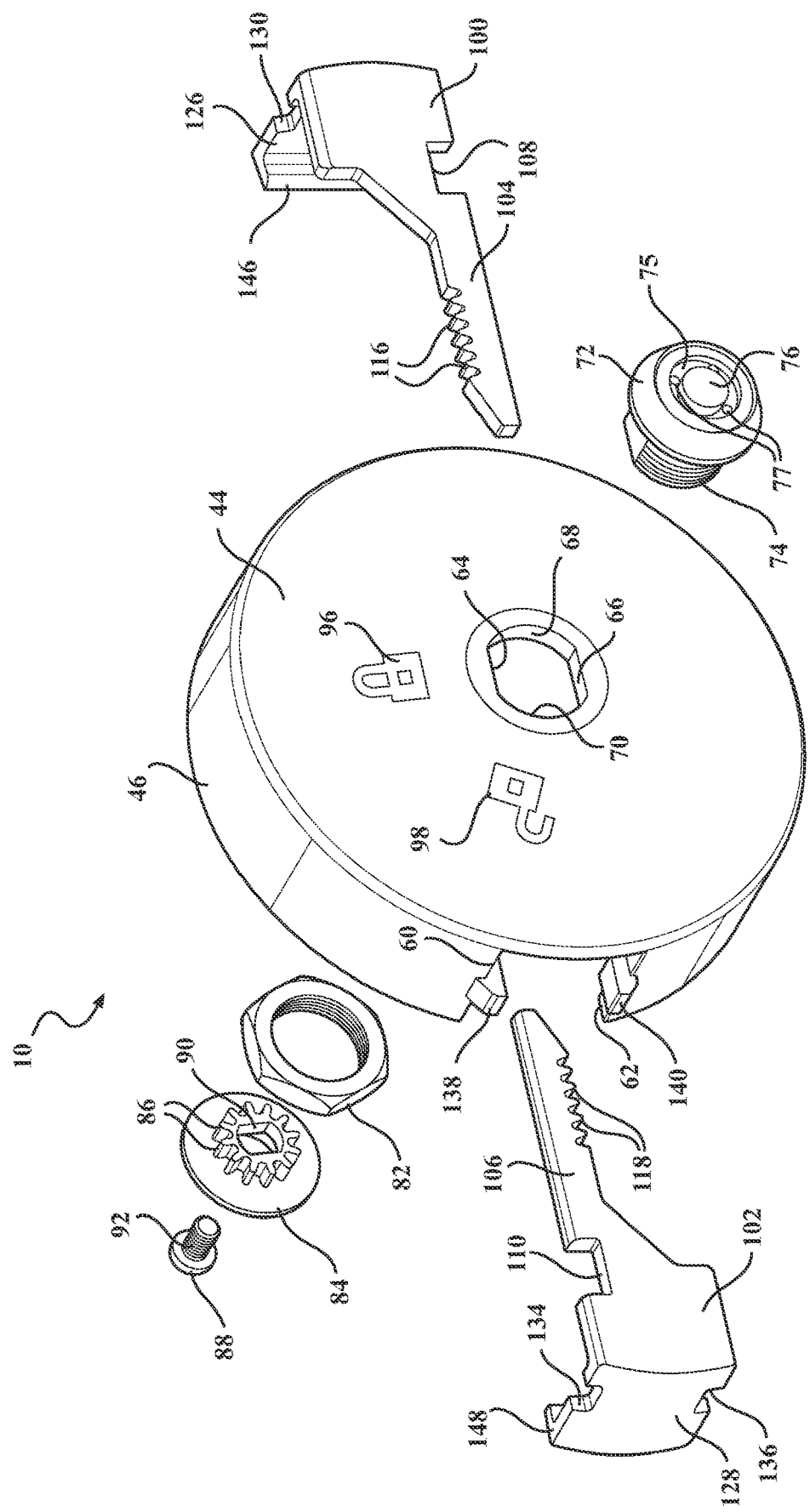
FIG. 23 is a 180 degree rotated exploded perspective based on FIG. 22.
Figure 24:
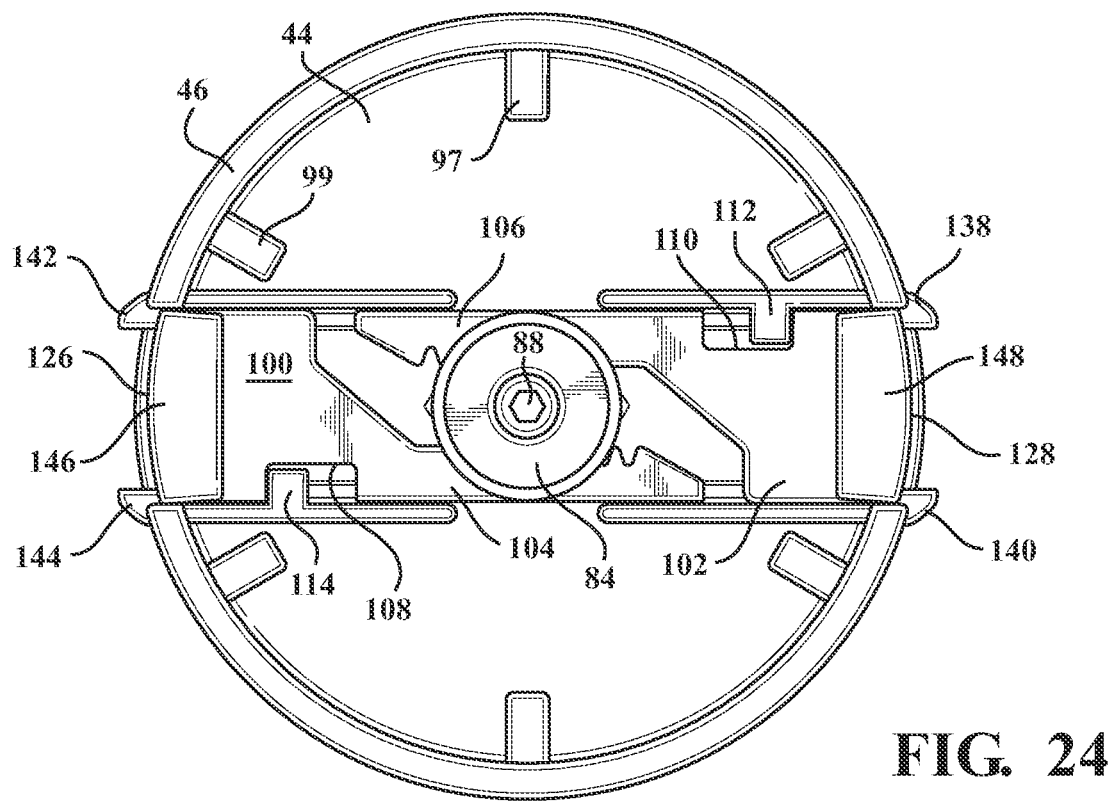
FIG. 24 is an underside plan view of the locking cover in the closed/locked position similar to as shown in FIG. 14.
Figure 25:
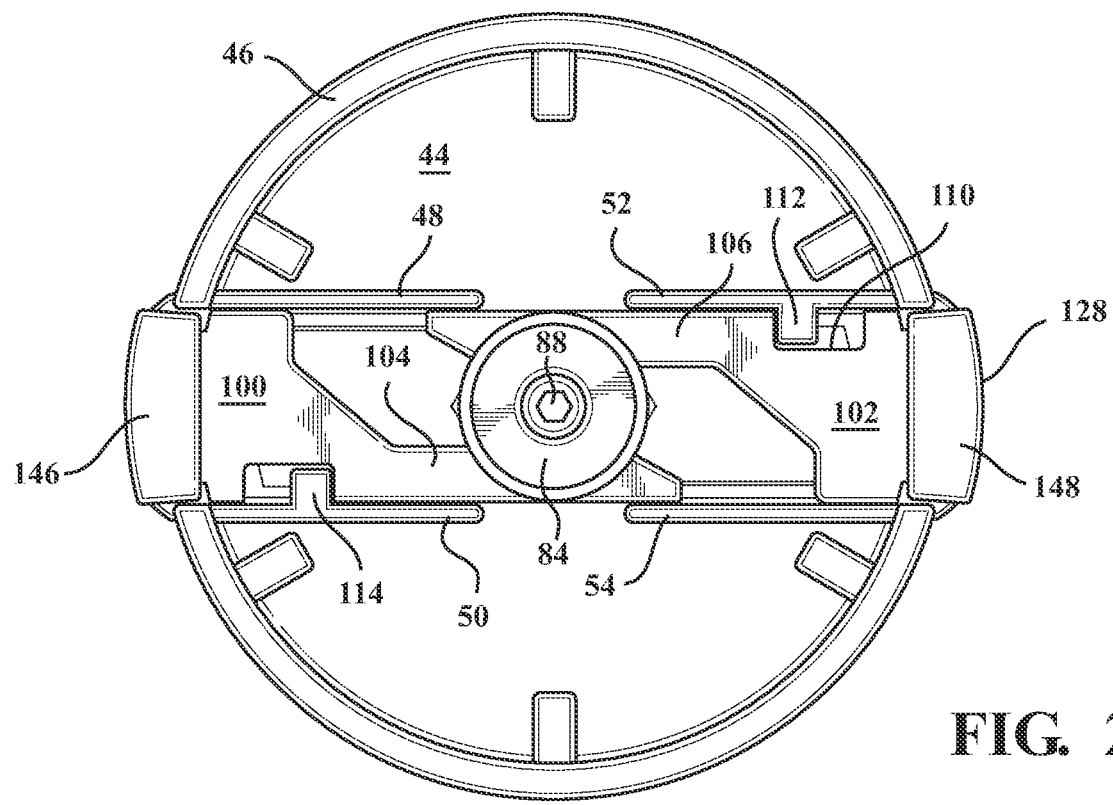
FIG. 25 is a succeeding plan view of the locking cover in the upon/unlocked position similar to as shown in FIG. 5.

With reference to the several figures, the cap 10 includes a three dimensional disk shaped body with a main, optionally flared, wall 44 supporting at its outer periphery an outer annular and circumferential extending end wall 46. FIGS. 22-26 provide a collection of exploded and assembled views of the cap 10 with locking mechanism which, referring initially to the inside exploded perspective of FIG. 22 and the rotated perspective of FIG. 23, depicts an interior (FIG. 22) of the body including pairs of support projections 48/50 and 52/54 which are configured on an inside surface of the main wall 44 and extend radially between outside notched ends defined in the annular end wall 46 (see opposing pairs of walls 56/58 and 60/62 at opposite edges of the end wall), as well as radially inward opposing a central aperture (see inner perimeter including flattened opposing side edges 64/66 and interconnecting rounded ends 68/70 defining a central interior location of the cap for mounting a combination key and gear actuating subassembly.

The combination key and gear subassembly includes a modified bolt having a rounded head 72 (see also FIG. 23) and a threaded shaft 74 generally approximating in cross section and dimension the outline of the central receiving aperture (64/66/68/70). The exposed direction of the rounded head 72 (FIG. 23) depicts a keyed annular recess interior, this depicted at 75 as an annular space defined between an the outer rounded head 72 and an inner coaxial projection at 76 and which, when engaged by a suitably configured key (not shown) rotates a stem portion (a projecting end of which is designated at 78 in FIG. 22) which is supported inwardly from the shaft 74 via an annular end support 80. As further shown, a series of circumferential abutments 77 are depicted within a base of the keyed annular recess 75 in order to seat with an appropriately configured insert portion of an associated key shaft for rotating the key and gear subassembly. It is also envisioned that the key recess configuration can be redesigned to accommodate other key designs.

A modified hex nut 82 threadably engages over the shaft 74 once seated through the central aperture pattern. A first configuration of a rotatable component is provided in the form of a gear which includes a flattened outer perimeter 84 and an inner supported teethed pattern 86 and which is sandwiched against the outside surface of the hex nut 82. A screw 88 is provided and seats through an interior aperture profile 90 of the gear within its circular teethed pattern, the threaded shaft 92 of the screw 88 engaging opposing interior teeth configured at 94 within a recessed pattern within the projecting end 78 of the rotating interior stem of the bolt.

In this manner, and upon assembly, rotation of the bolt by the key, between locked (retracted) position 96 depicted on the cap body (FIG. 23) and angularly offset unlocked (expanded) position 98 results in the extension and unlocking of the pair of locking tabs, these depicted at 100 and 102. As again best shown in FIG. 22, a plurality of protrusions 97, 99, et. seq., are formed along circumferentially spaced locations of the cap 10 at its inside outer edge between the flared central surface 44 and the annular side wall 46, these coacting with the lateral projections 40, 42, et seq. on the outside of the projecting portion side wall 32 of the unit 12, and in order to define the range of rotation of the cap, and thereby the central combination key and gear assembly relative to the radially displaceable locking tabs 100 and 102.

The locking tabs 100 and 102 as shown each include a planar base portion, from which extends an elongate extending portion, see at 104 and 106,. The base portions (also depicted at 100 and 102) are dimensioned to seat within the gaps defined in the annular side surface 46 of the cap 10 (see again spaced apart edge surfaces 60/62 in FIG. 23). The base portions are further notched, at 108 and 110 so that, upon seating the locking tabs 100 and 102 into the cap 10, a pair of offset projections 112 and 114 formed into the cap underside in proximity to selected rail defining support projections, at 52 and 50 (see in FIGS. 22 and 24) seat the locking tab notches 108 and 110 around the cap underside projections 112 and 114 and thereby limit the range of radial displacement of the locking tabs between the retracted/locked position of FIG. 24 and the expanded/unlocked position of FIG. 25.

Figure 26:
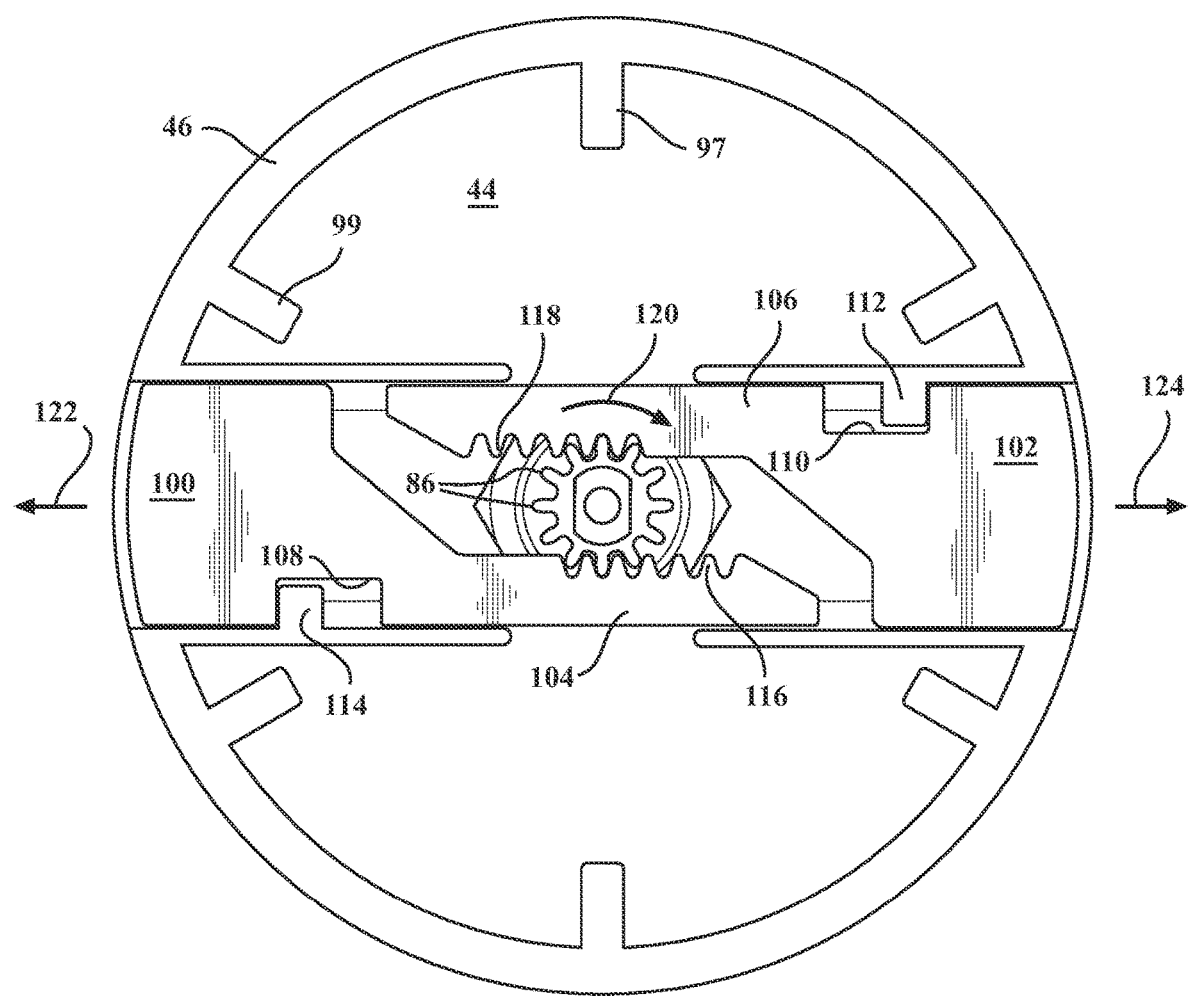
FIG. 26 is an illustration similar to FIG. 24 with the backing of the central gear removed in order to better illustrate the teethed arrangement between the central gear and the pair of outer displaceable locking tabs.

The locking tabs each further include a plurality of linear teeth defined upon opposing extending edges of narrowed extending portions, these depicted at 104 and 106, respectively, and which are shown by teeth 116 provided along the narrowed extending portion 104 of locking tab 100 and opposing teeth 118 likewise provided along narrowed extending portion 106 for locking tab 102. The narrowed opposing extending portions 104 and 106 of the locking tabs 100 and 102, upon, assembly and as best shown in FIG. 26 with the backing 84 of the central gear removed, result in the teeth 116 and 118 of the locking tabs 100 and 102 overlappingly meshing with opposite rotary teeth 86 of the central gear and the locking tabs extending in opposite outward directions at a one hundred and eighty degree offset. As previously described, and upon a suitable key being inserted into the exposed face of the outer bolt 76 and the central stem and end projection 78 being rotated, the gear 84 is rotationally actuated (see directional arrow 120 in FIG. 26) so that the locking tabs 100 and 102 are actuated radially outwardly in the direction of opposite linear arrows 122 and 124 for outwardly displacing the locking tabs.

As further shown, each of the locking tabs 100 and 102 also includes an angled end extending portion 126 and 128, these each including notched opposite edges 130/132 and 134/136, the notched edges receiving or seating additional alignment tabs, pairs of these shown at 138/140 and 142/144 associated with each of the notched side wall surfaces 56/58 and 60/62 defined in the cap 10. Finally, the tabs 100 and 102 each further include a reverse and inwardly turned edge flange, at 146 and 148 respectively, extending from the remote edge of the angled end portions 126/128. As best shown from the assembly views of FIG. 2 et seq., the flange ends 146 and 148 of the locking tabs 100 and 102, in the retracted/locked position, abut against the underside annular rim edge, again at 36 of the outer annular portion (see in FIGS. 2-4, 11-12 and 16 adjoining the side wall 32 of the capless unit 12).

Figure 2:
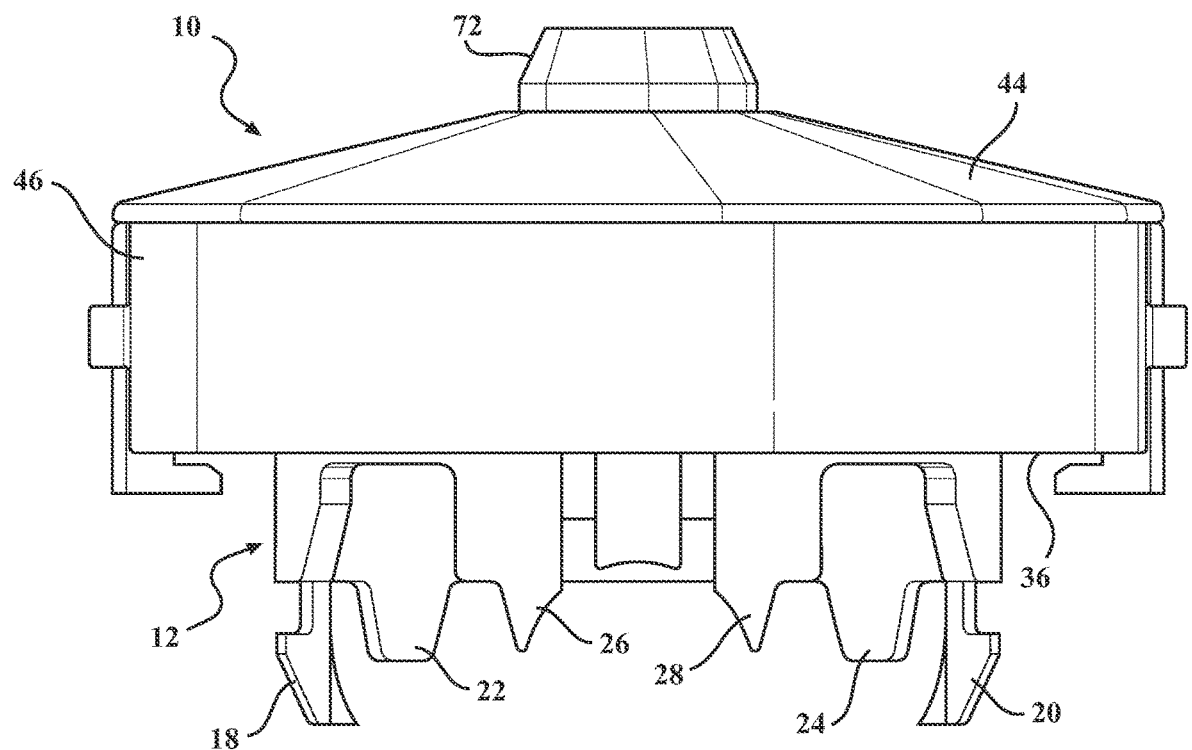
FIG. 2 is a side view of the unit FIG. 1 and illustrating the lower annular engagement structure for with gripping tabs for mounting to the end of the fuel filler pipe.

FIG. 3 is cutaway of the unit in FIG. 2 and illustrates the pair of gear driven locking tabs 100 and 102 in the inwardly displaced locked position relative to the fixed portions of the annular support structure for the capless unit (flange ends 146/148 in abutment with the underside rim 36 of the capless unit 12 in turn mounted to the exposed end of the fill pipe 14. FIG. 4 is a successive illustration to FIG. 3 and illustrating the locking tabs 100 and 102 outwardly displaced from locked position 96 (FIG. 23) to unlocked position 98, thereby permitting rotation of the central gear 84, and outward opposite displacement of the locking tabs 100 and 102 (also FIG. 26), at which point the inwardly turned end flanges 146 and 148 move outwardly relative to the underside 36 of the capless unit rim, along with the end walls 126 and 128 displacing outwardly of the sides of the capless unit and the locating tabs 138/140 and 142/144, thereby unseating the locking tabs 100 and 102 from abutting contact with the underside of the outer part of the capless unit, thereby permitting the cap 10 to displace relative to the capless unit 12, in the illustrated embodiment shown in a sliding/axial fashion, as assisted by the opposing co-acting and seating projections 97, 99, etc., located on the cap underside relative to those at 40, 42, et seq. configured on the outer annular rim 32 of the capless unit, again to permit removal of the cap integrating the locking mechanism from the support structure mounted to the fuel filler pipe and thereby gain access to the fill pipe. Again, and while the present invention contemplates the cap being slidably removed/reattached to the outside part shown of the capless unit, it is again understood that the interfaces can be redesigned in alternate variants within the scope of the invention such that the cap is caused to rotate or otherwise displace during removal or reattachment from the fill pipe.

Figure 5:
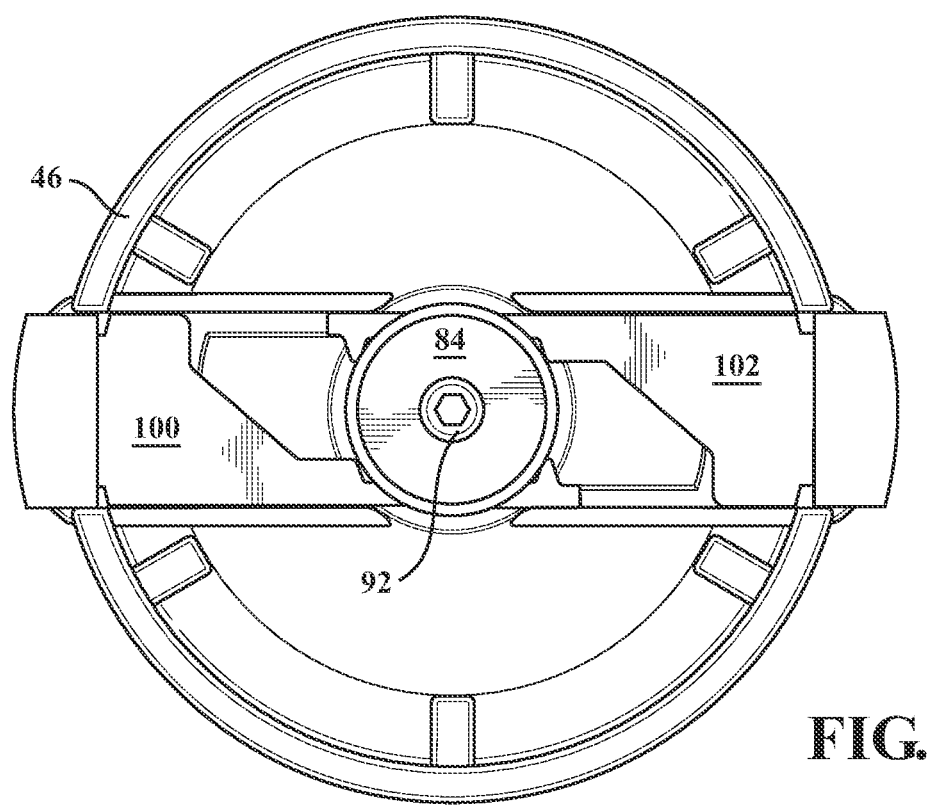
FIG. 5 is an underside view of the upper cap portion only of the unit and illustrating the locking tabs in the outwardly displaced and unlocked position of FIG. 4.
Figure 6:
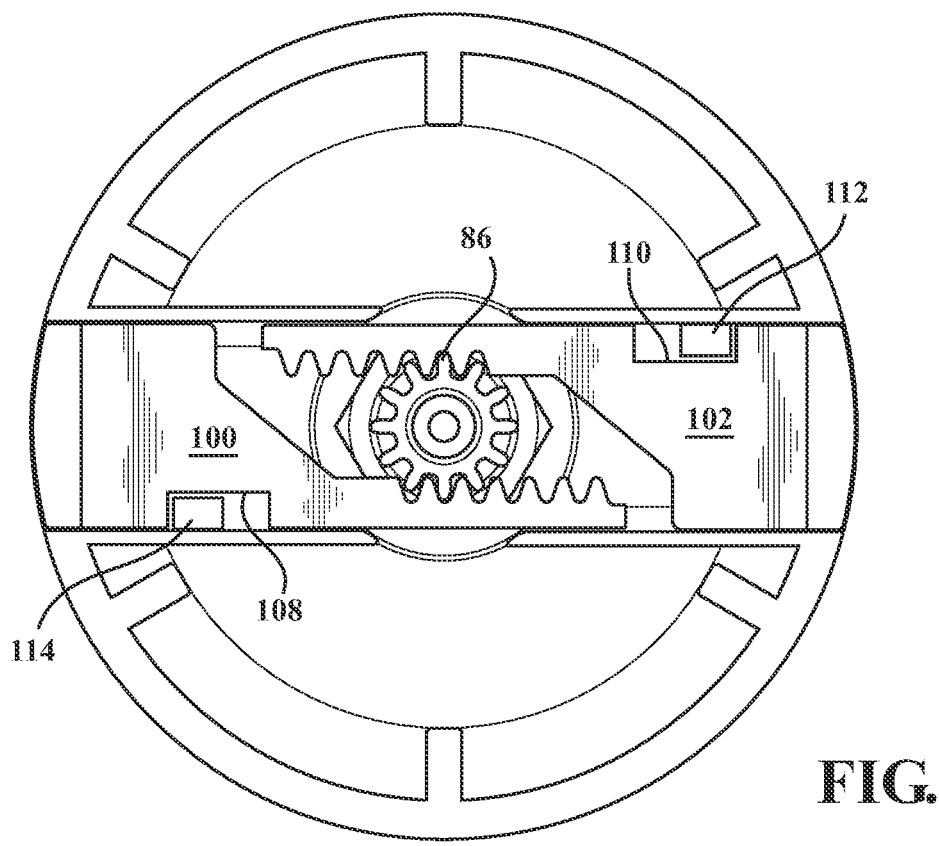
FIG. 6 is a further underside view of the upper cap portion similar to that depicted in FIG. 5 and with additional elements removed in order to better illustrate the central key actuating and rotatable gear, as well as the slots defined in the locking tabs, projections extending within the slots defining a limited range of displacement of the locking tabs between the closed/locked position (shown) and the open/unlocked position.

The remaining illustrations are provided for purposes of completeness and generally repeat those features previously described, with FIG. 5 depicting an underside view of the upper cap portion 10 only of the unit and illustrating the locking tabs 100 and 102 in the outwardly displaced and unlocked position of FIG. 4. FIG. 6 is a substantial repeat of FIG. 26 previously described and likewise illustrates an underside view of the upper cap portion 10, similar to that depicted in FIG. 5 and with additional elements removed in order to better illustrate the central key actuating and rotatable gear (rotary teeth 86), as well as the slots 108 and 110 defined in the locking tabs 100 and 102, the projections 112/114 (also termed sliding limiters) extending within the slots and defining a limited range of displacement of the locking tabs 100 and 102 between the closed/locked and open/unlocked positions.

Figure 7:
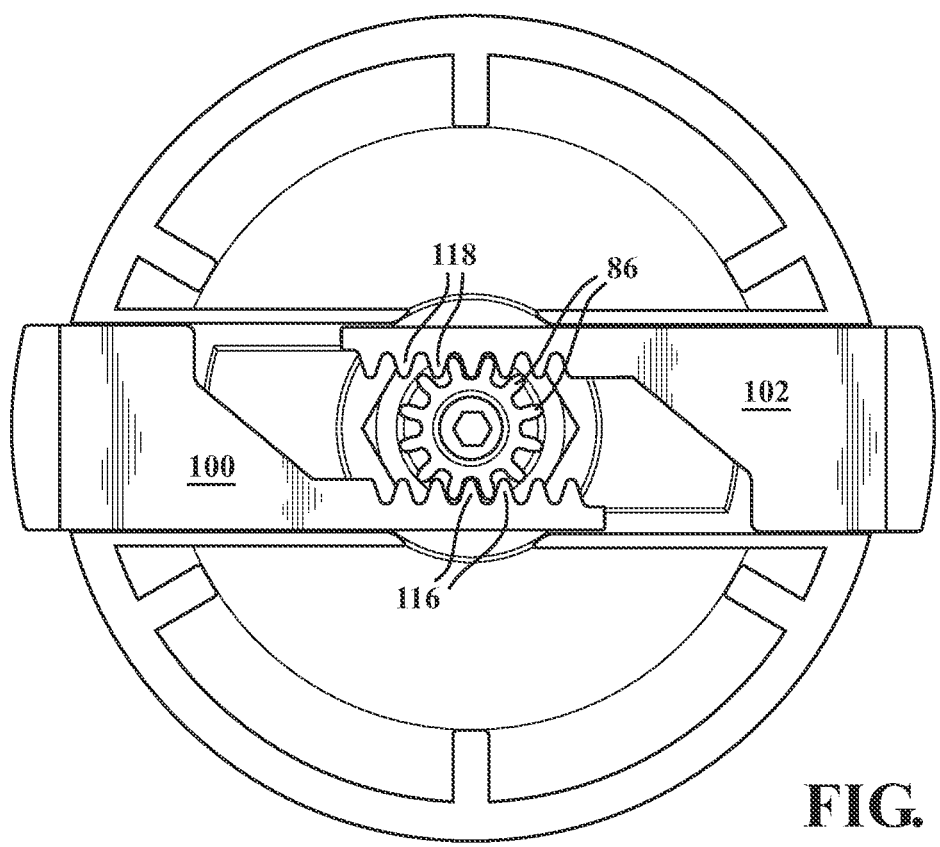
FIG. 7 is an illustration of the upper cap portion depicted in FIG. 6 and with the locking tabs expanded outwardly to the unlocked/open position corresponding to FIGS. 4-5.
Figure 8:
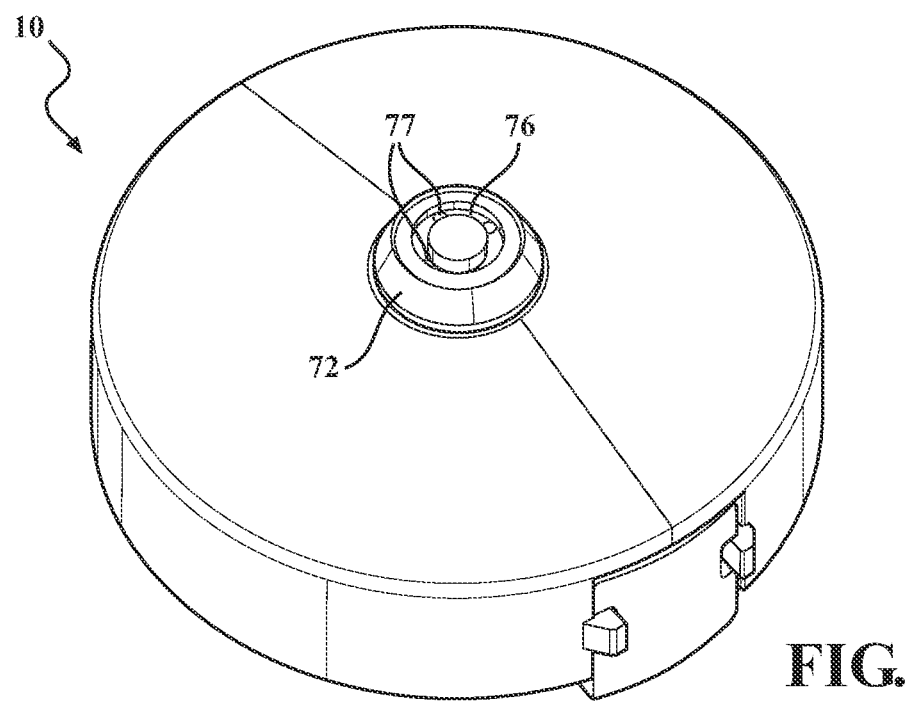
FIG. 8 is a rotated perspective of the capless unit with locking mechanism shown in FIG. 1 and better illustrating the key configuration of the central rotatable gear in combination with the configuration of the locking tabs in the closed/locked position.

FIG. 7 is an illustration of the upper cap portion depicted in FIG. 6 and with the locking tabs 100 and 102 again expanded outwardly to the unlocked/open position corresponding to FIGS. 4-5. FIG. 8 is a rotated perspective of the capless unit with locking mechanism as substantially shown in FIG. 1 and better illustrating the key configuration of the central rotatable gear in combination with the configuration of the locking tabs in the closed/locked position.

Figure 9:
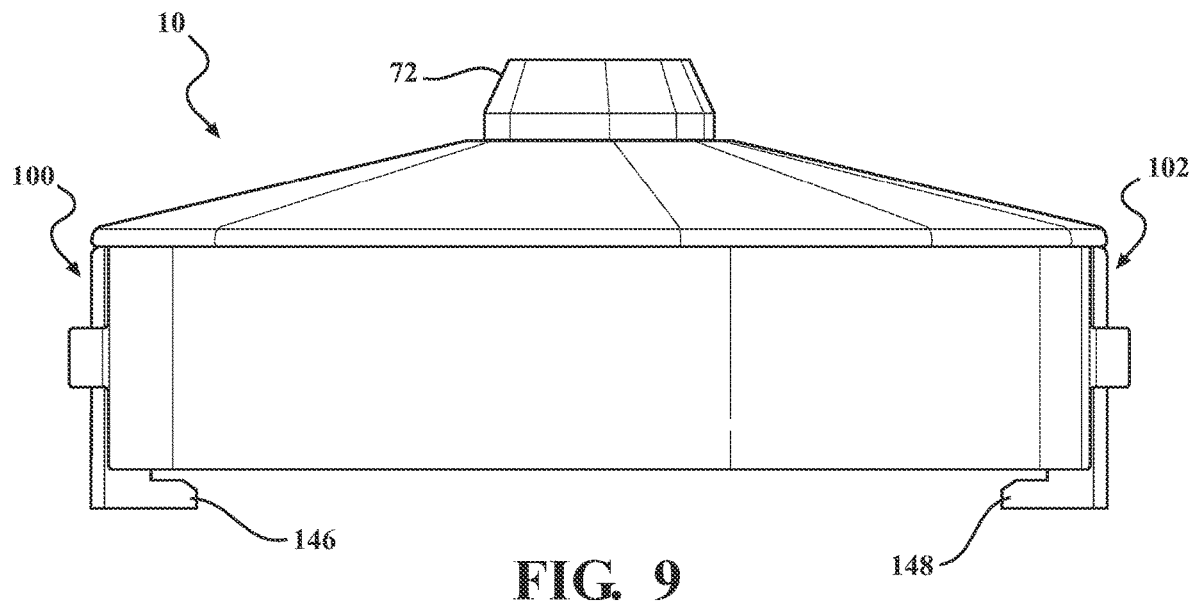
FIG. 9 is a plan view of the upper cap with built in locking tabs in the closed and locked position.
Figure 10:
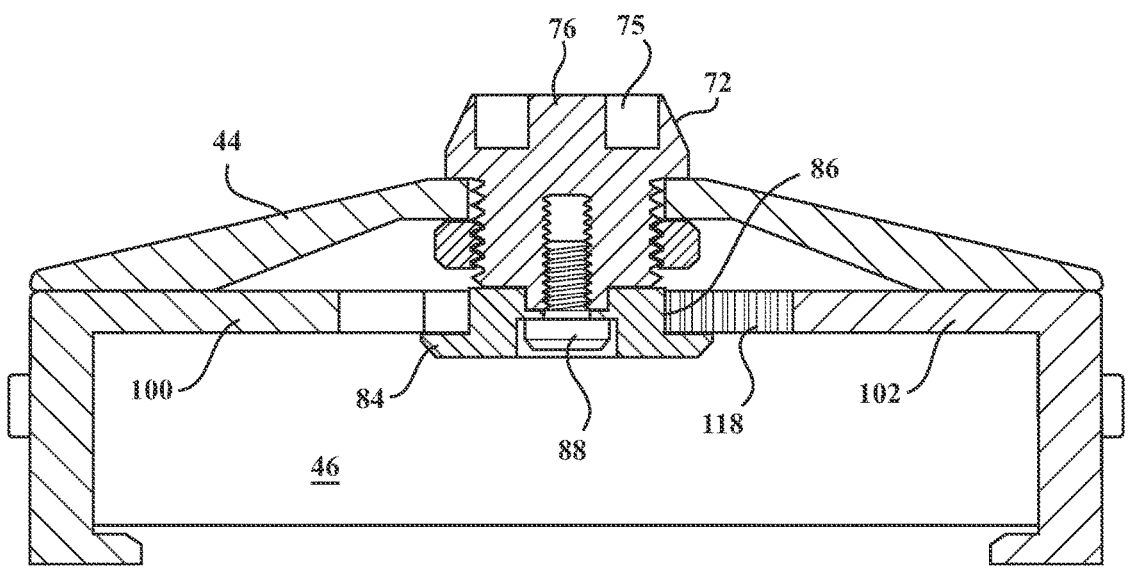
FIG. 10 is a cutaway view of FIG. 9, similar to that previously shown in FIG. 3, and depicting the gearing arrangement established between the central rotatable and key actuated gear and the pair of opposite displacing locking tabs.
Figure 11:
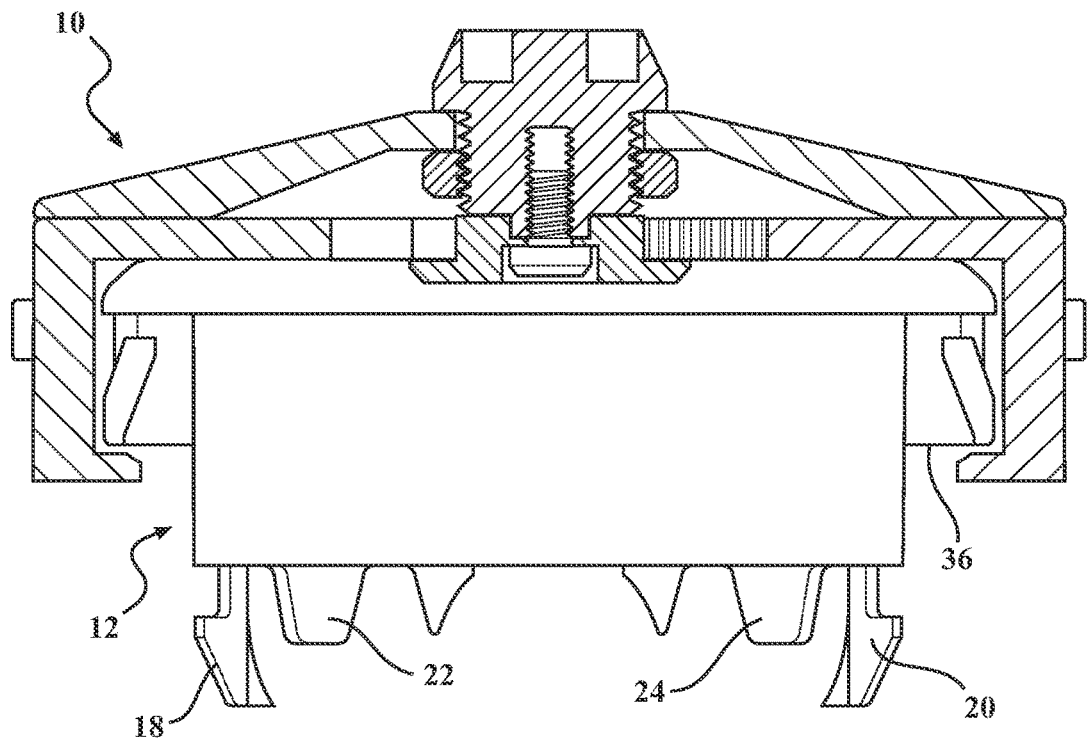
FIG. 11 is a side plan cutaway more closely corresponding to the prior cutaway of FIG. 3 and depicting an engagement of the cap mounted locking tabs with annular rim locations of the base structure secured to the fuel filler pipe.
Figure 12:
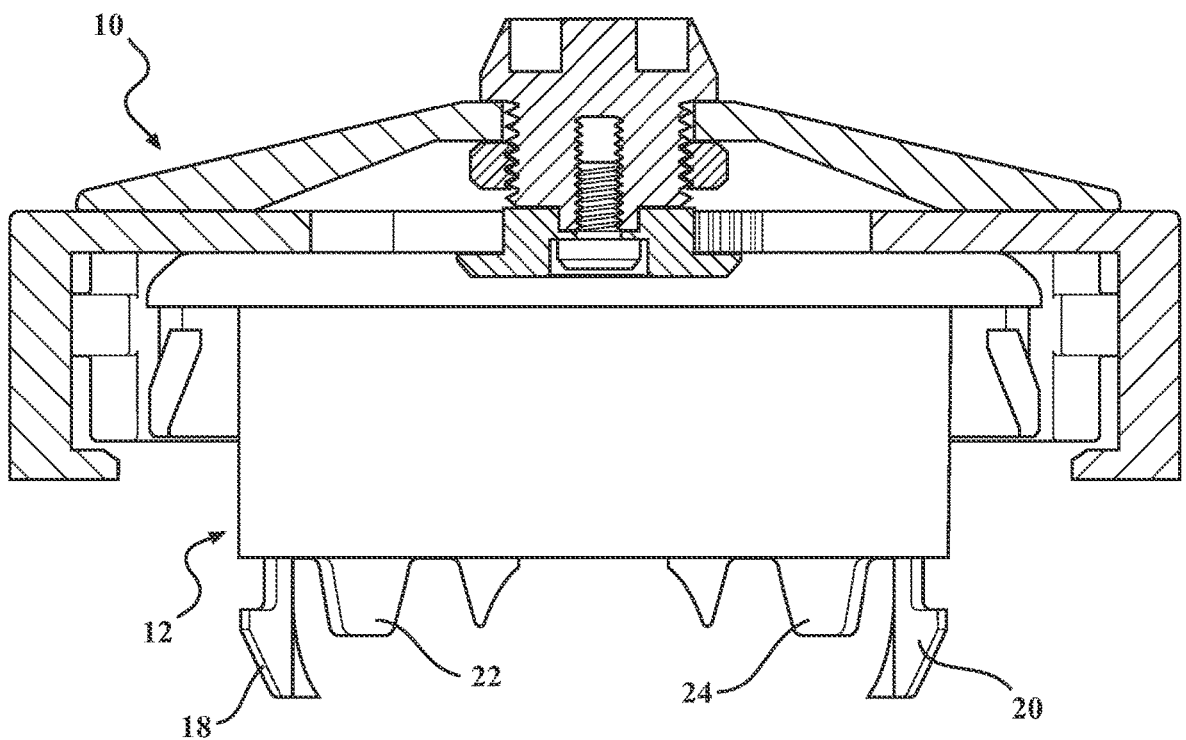
FIG. 12 is a succeeding side plan cutaway corresponding to that previously shown in FIG. 4 and illustrating the locking tabs in the open/unlocked position for permitting removal of the cap from the base structure mounted to the fuel filler pipe.

FIG. 9 is a plan view of the upper cap 10 with built in locking tabs 100 and 102 in the closed and locked position, with FIG. 10 providing a further cutaway view of FIG. 9, similar to that previously shown in FIG. 3, and depicting the gearing arrangement from another angle established between the central rotatable and key actuated gear 84 and the linear gear patterns 116 and 118 configured upon the extending portions of the pair of opposite displacing locking tabs 100 and 102. FIG. 11 is a side plan cutaway more closely corresponding to the prior cutaway of FIG. 3 and depicting an engagement of the cap mounted locking tabs 100 and 102 with annular rim locations of the base structure secured to the fuel filler pipe. FIG. 12 is a succeeding side plan cutaway corresponding to that previously shown in FIG. 4 and illustrating the locking tabs 100 and 102 again in the open/unlocked position for permitting twist and removal of the cap 10 from the base structure (capless unit 12) mounted to the fuel filler pipe 14.

Figure 13:
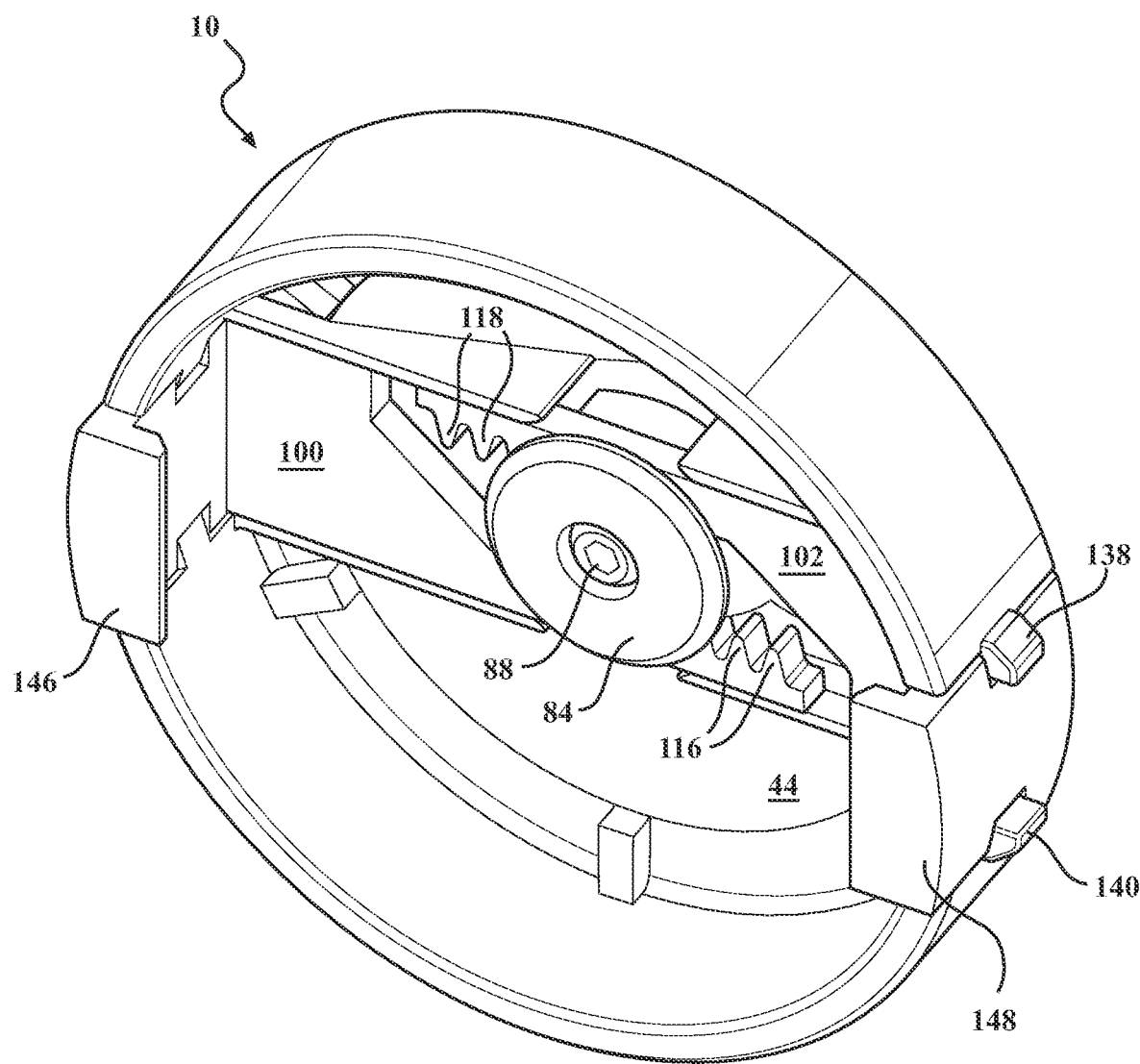
FIG. 13 is an underside perspective of the cap portion also depicted in FIG. 6.
Figure 14:
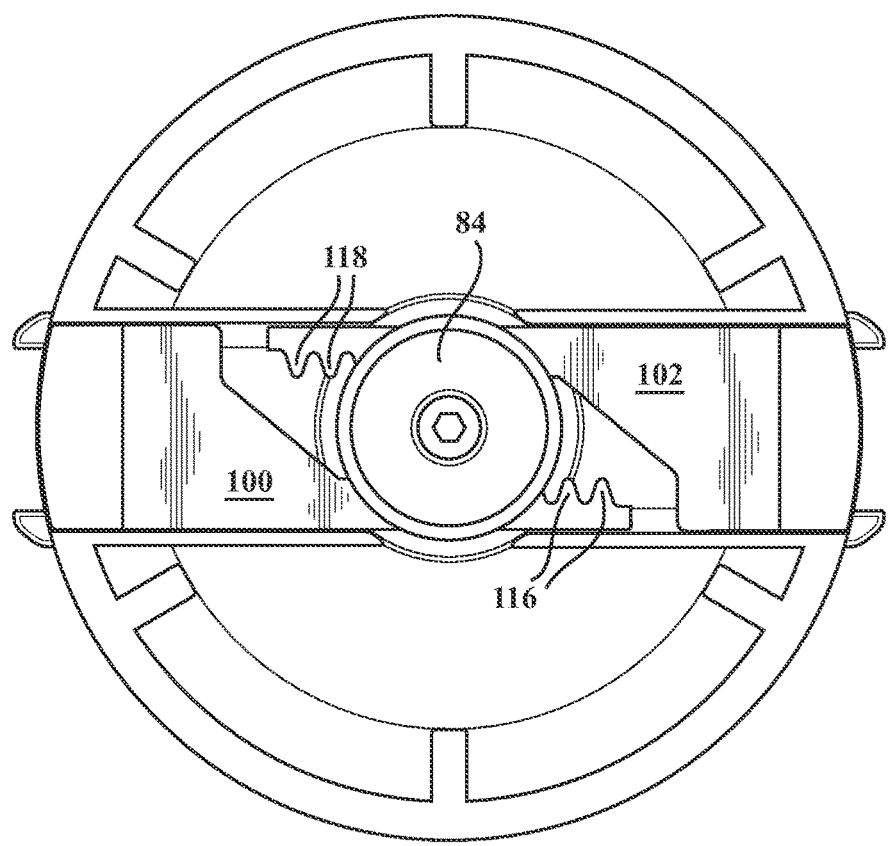
FIG. 14 is a plan underside view of the cap portion in FIG. 13.
Figure 15:
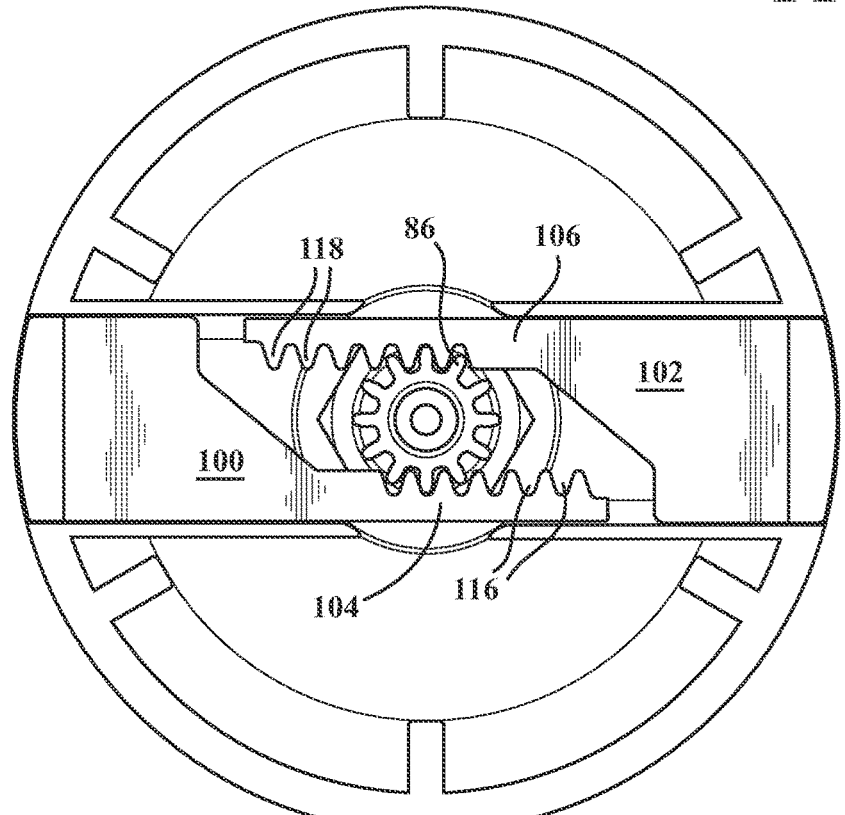
FIG. 15 is a succeeding plan underside view of the cap portion in the closed/locked position of FIGS. 13-14 and substantially identical to that shown in FIG. 6.
Figure 17:
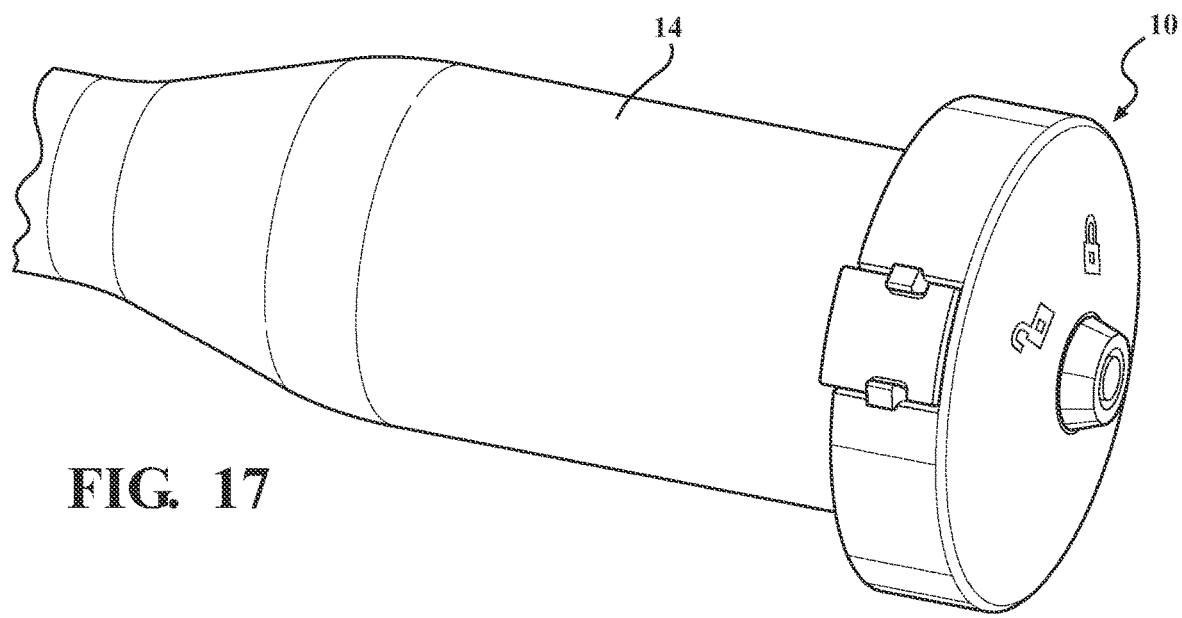
FIG. 17 is an illustration of the locking cover of FIGS. 1 and 8 secured over the capless filter pipe.

FIGS. 13-15 are general repeats of FIGS. 22-26 previously described, with FIGS. 16-21 further depicting various views associated with the filler pipe, these further including the integrated capless unit 12 exposed in engagement over the pipe 14 (FIG. 16), and the locking cover secured over the capless filter pipe (FIG. 17). FIG. 18 provides a side cutaway view of the assembled locking cover in engagement of the capless filler pipe in the closed/locked position (also FIG. 24), with FIG. 19 a succeeding side cutaway view similar to FIG. 18 and FIG. 25 and showing the locking cover displaced into the open/unlocked position. FIG. 20 is a cutaway illustration of the locking cover removed from the filler pipe/capless unit, with FIG. 21 an underside perspective view of the cap portion previously shown in FIG. 13 in a further rotated position.

Figure 27:
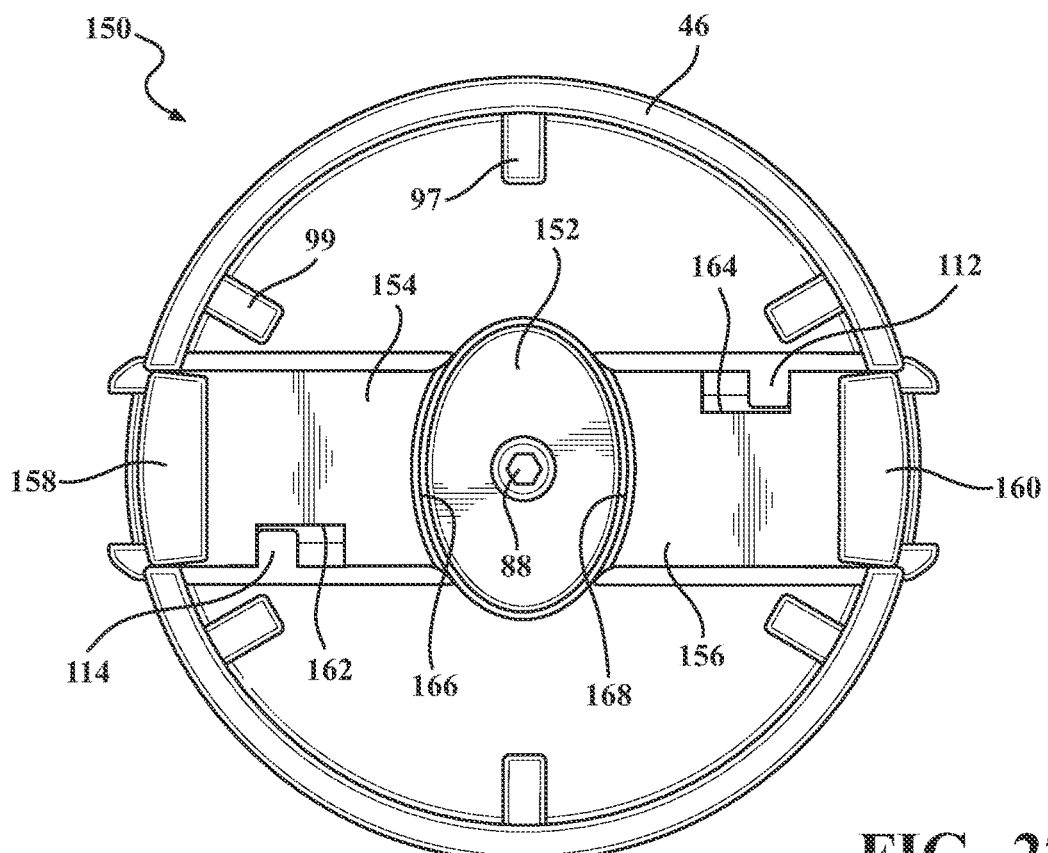
FIG. 27 is an underside view of an upper cap portion according to an alternate variant of the present invention in which the gear assembly is substituted by an elliptical cam mechanism and depicting the redesigned locking tabs in the inwardly retracted and locked position relative to the fixed underside support surface of the unit fixed to the associated filler pipe.

Proceeding to FIG. 27, an underside view is depicted at 150 of an upper cap portion according to an alternate variant of the present invention in which the gear assembly is substituted a further configuration of a rotatable component in the form of an elliptical cam mechanism, such further depicted by elliptical and key rotatable cam component 152. Also shown are redesigned locking tabs, at 154 and 156, these exhibiting underside configured portions 158 and 160 respectively and shown in the inwardly retracted and locked position relative to the fixed underside support surface of the unit 36 fixed to the associated filler pipe (see also FIGS. 29-30).

Figure 28:
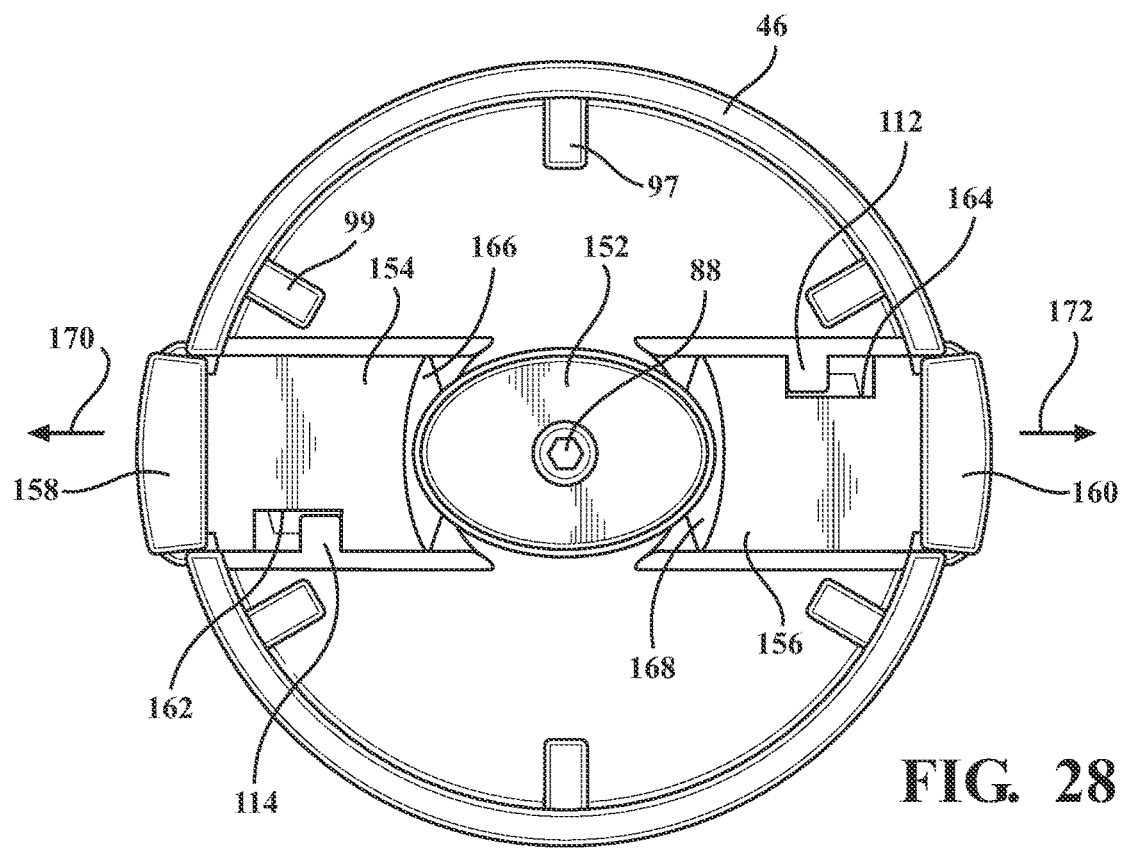
FIG. 28 is a succeeding illustration of the upper cap underside in which the locking tabs are exhibited in the outwardly displaced and unlocked position relative to the fixed unit and in response to rotation of the elliptical cam component.

As with the preceding embodiment (see again FIGS. 6 and 22), the base portions of the locking tabs 154/156 are notched, at 162/164 in FIGS. 27-28 in comparison to at 108/110 in FIG. 6, and so that, upon seating the locking tabs into the cap portion 150, a pair of offset projections 112 and 114 formed into the cap underside in proximity to selected rail defining support projections, at 52 and 50 (see in FIGS. 22 and 24) seat the locking tab notches 108 and 110 around the cap underside projections (again at 112 and 114) and thereby limit the range of radial displacement of the locking tabs between the retracted/locked position of FIG. 27 and the expanded/unlocked position of FIG. 28.

The elliptical actuated component 152 is shown in FIG. 27 in a first position corresponding to the locking tabs 154/156 in the closed/locked position and by which arcuate inner end facing surfaces of the locking tabs (see at 166 and 168) seat against the opposite side surfaces of the elliptical component 152. FIG. 28 is a succeeding illustration of the upper cap underside in which the locking tabs are exhibited in the outwardly displaced and unlocked position relative to the fixed unit and in response to rotation of the elliptical cam component 152, such as without limitation in a ninety degree rotation as directed by turning of the key component 72. In this fashion, the opposite and arcuate end surfaces of the elliptical component 152 are rotated into alignment with the inside arcuate surfaces 166/168 of the locking tabs 154/156, resulting in outward and opposite lateral displacement of the locking tabs as indicated by arrows 170 and 172 outwardly displace the underside configured portions 158 and 160 out of engagement from the fixed underside support surface of the unit 36 fixed to the filler pipe.

Figure 29:
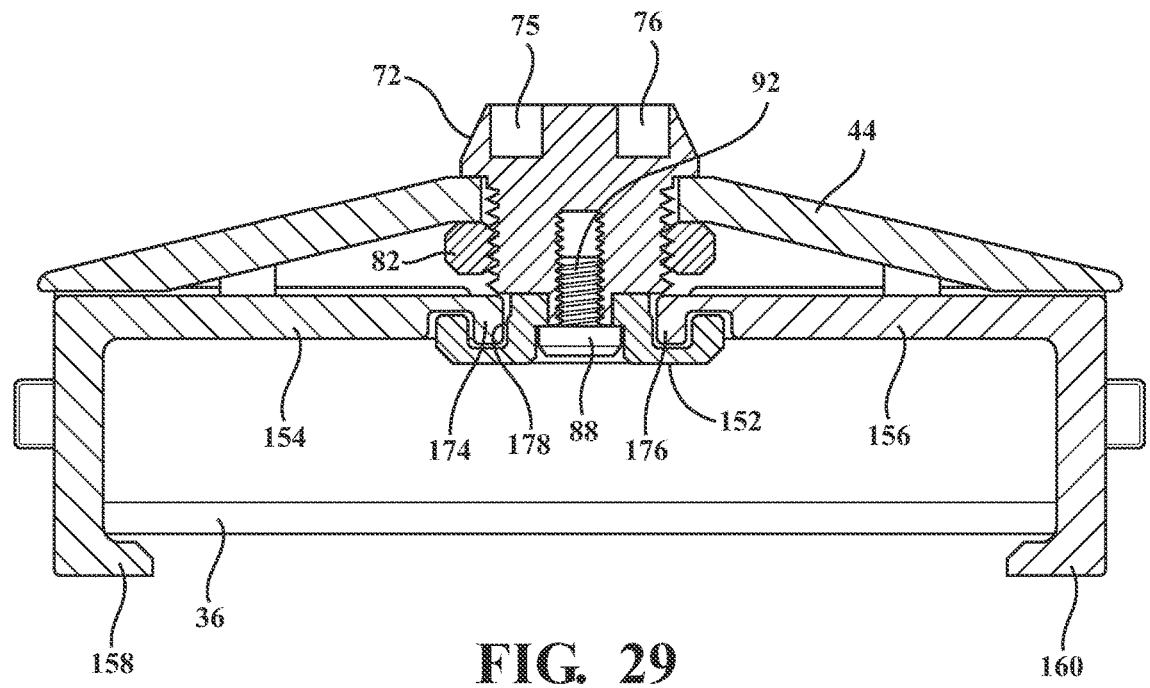
FIG. 29 is a cutaway view of the upper cap portion in the locked position of FIG. 27 and showing the redesigned locking tabs with downward projections at their inner ends which seat within a circumferential groove formed in the centrally positioned elliptical and key rotatable component.
Figure 31:
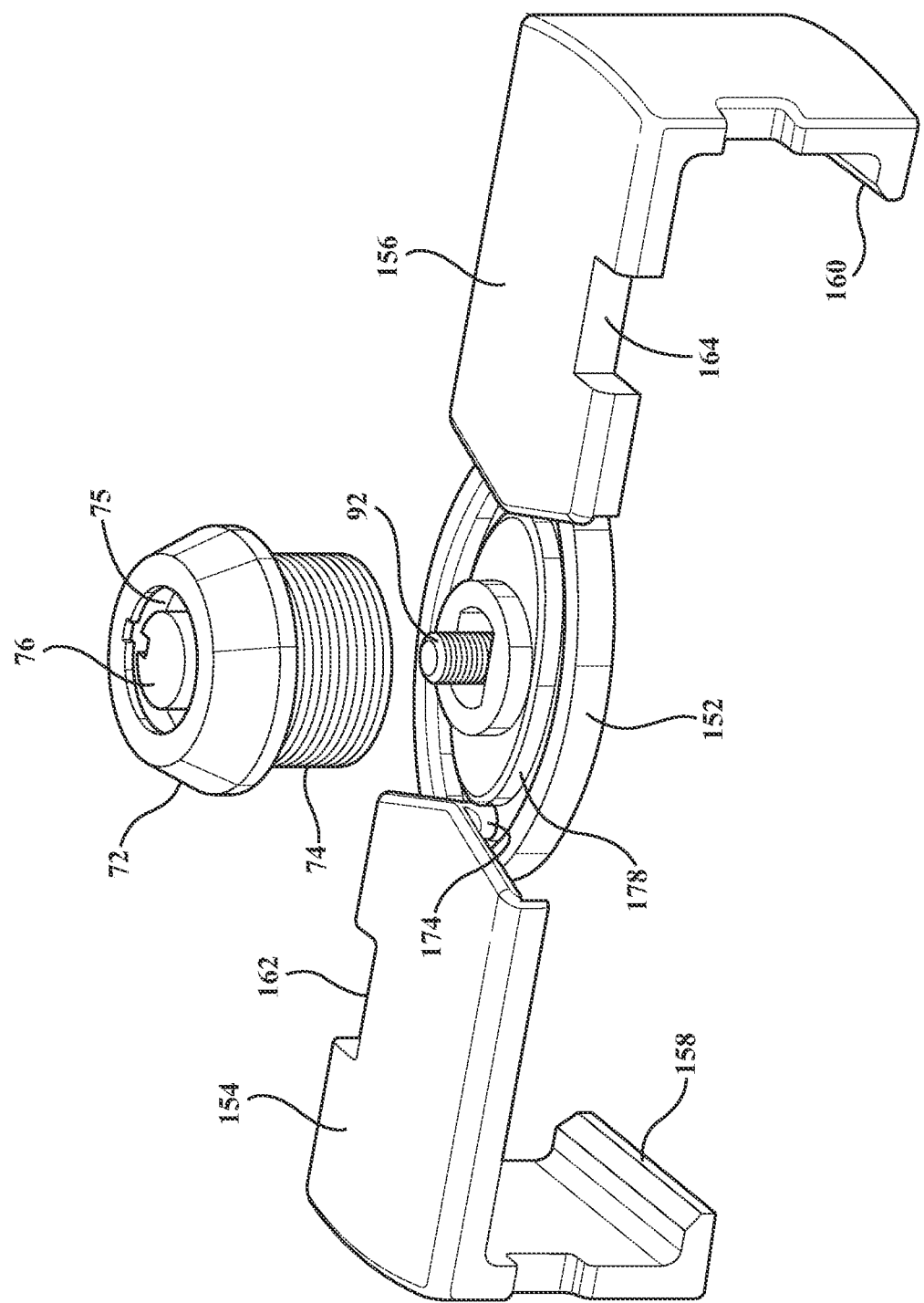
FIG. 31 is a perspective and partially exploded view of the locking tabs associated with the redesigned upper cap portion and better showing the configuration of the elliptical component with circumferentially configured groove for receiving the locking tab inner end projections.

FIG. 29 is a cutaway view of the upper cap portion in the locked position of FIG. 27 and showing the redesigned locking tabs 154/156 with downward projections (at 174 and 176) at their inner ends which seat within a perimeter extending (also circumferential) groove (at 178) formed in the centrally positioned elliptical and key rotatable component 152. FIG. 31 is a perspective and partially exploded view of the locking tabs associated with the upper cap portion (in the expanded and unlocked position) and better showing the configuration of the elliptical component 152 with circumferentially configured groove 178 for receiving the locking tab inner end projections (one of which is again shown at 174 for corresponding locking tab 154). The remaining features of the key actuated component 72 and similar support structure including the underside mounting screw 88 with threaded shaft 92 are repeated from the first embodiment.

Figure 30:
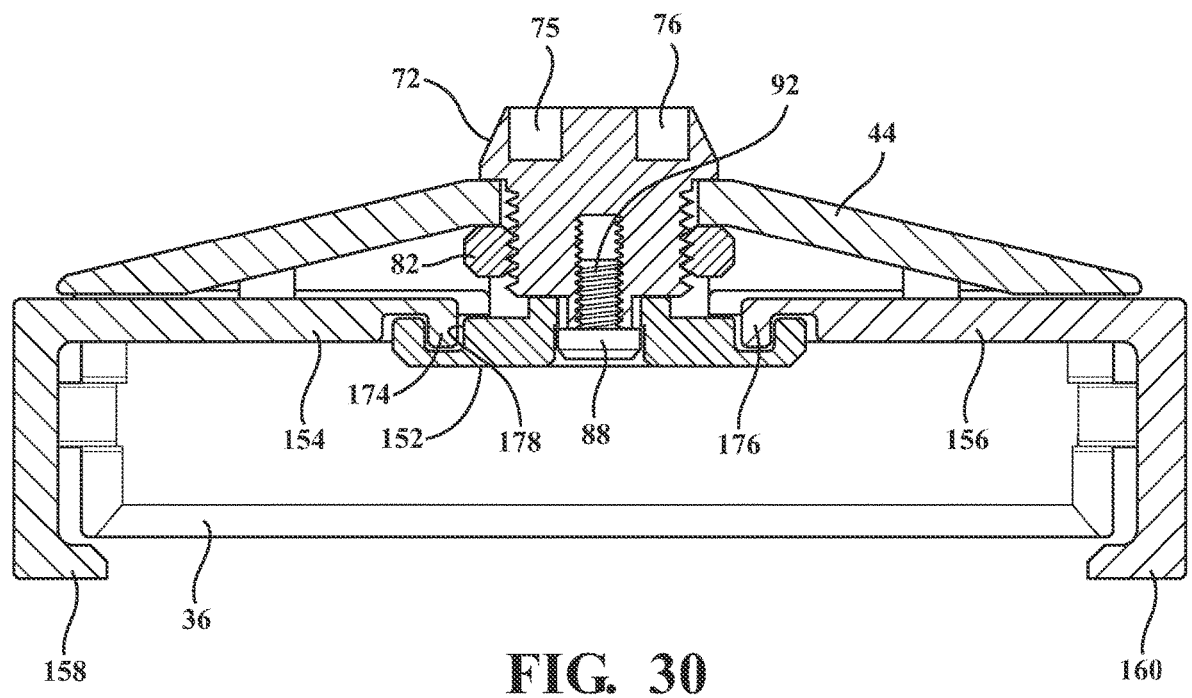
FIG. 30 is a cutaway view of the upper cap portion in the unlocked position of FIG. 28 and in which the elliptical component is rotated ninety degrees, resulting in the traveling of the locking tab projections within the circumferential groove formed in the elliptical component, causing the inner end projections of the locking tabs to displace laterally outwardly from their inner engaged to outer released positions relative to the underside supporting surface associated with the fixed unit.

Finally, FIG. 30 is a cutaway view of the upper cap portion in the unlocked position of FIG. 28 and in which the elliptical component is rotated ninety degrees, resulting in the traveling of the locking tab projections 174/176 within the circumferential groove 178 formed in the elliptical component, this in turn causing the inner end projections 158/150 of the locking tabs 154/156 to displace laterally outwardly from their inner engaged to outer released positions relative to the underside supporting surface associated with the fixed unit.

Having described my invention, other and additional preferred embodiments will become apparent to those skilled in the art to which it pertains, and without deviating from the scope of the appended claims. This can again include any other arrangement of locking tabs, including the use of a single tab or any plurality, along with reconfigurations to the gearing mechanism for actuating between the locked and unlocked positions.

Similarly, the interfaces between the cover integrated locking tabs and the engagement locations of the portion shown of the capless unit can also be redesigned in order define the locking to unlocking motion to alternatively include any expansion, retraction or possible offset or eccentric induced motion to the locking tabs as provided by the gearing architecture integrated into the cap. This can also include the central key actuated gear being substituted for any other activating portion, whether geared or otherwise.

Other changes can again include the cap or filler pipe supported unit being further redesigned for providing any type of rotational, eccentric or other non-rotational displacement associated with removal and reattachment. This can further envision the support structure between the cap underside or rim and the opposing exterior locations of the outside part of the capless unit being further designed to interface in alternate configurations such that, upon engaging the key/gear components, the locking tabs are displaced between the locked and unlocked positions.

The invention claimed is:

1. A lockable assembly for a fuel filler pipe, comprising:
   a unit fixedly mounted to the fuel filler pipe to define an access passageway within the filler pipe;
   a cap portion engageable upon said unit to block the access passageway;
   a key receiving portion incorporated within said cap portion, said key receiving portion communicating with a rotatable gear component arranged on an underside of said cap portion;
   a pair of locking tabs which are radially displaced via said rotatable gear component so that said tabs displace in opposite directions, said locking tabs each having a plurality of extending teeth in meshing engagement with said gear component and, in response to rotation of said key receiving portion, causing said locking tab to displace between lock and unlock positions of said cap portion with said unit; and
   a pair of slots defined in said locking tabs for seating projections extending within said slots to define a limited range of displacement of said locking tabs between the lock and unlock positions.

2. The assembly of claim 1, the filler pipe having a flange end adapted to support said unit, said unit further comprising as an annular body having a plurality of biasing legs adapted to engage inside circumferential wall locations of the fuel filler pipe.

3. The assembly of claim 2, said plurality of biasing legs further comprising a larger pair of legs in combination with a collection of smaller tangs extending from annular locations of said unit.

4. The assembly of claim 1, said cap portion further comprising a three dimensional disk shaped body with a main wall supporting at its outer periphery an outer annular and circumferential extending end wall.

5. The assembly of claim 4, said unit further comprising an underside annular rim edge and adjoining circumferential outer side wall, upon which are configured lateral projections opposing an inner circumferential surface locations of said cap portion when said cap portion is supported over said unit and so that, and upon displacing said locking tabs out of contact with said fuel filler pipe affixed unit, said cap portion can be axially removed to reveal the fuel filler pipe.

6. The assembly of claim 5, further comprising an underside surface of said main wall of said cap portion including pairs of support projections for receiving and guidably supporting said locking tabs, said pairs of support projections each extending radially between an outside notched end defined in said outer end wall of said cap portion and a central located aperture in said main wall defining an interior location of said cap for mounting said key receiving portion and said rotatable component.

7. The assembly of claim 1, said locking tabs each further comprising a planar base portion from which extends a narrowed elongate extending portion.

8. The assembly of claim 7, further comprising said base portion of each locking tab being dimensioned to seat within said cap portion.

9. The assembly of claim 8, further comprising said base portion of each locking tab being notched so that, upon seating said locking tabs into said cap portion underside located pairs of support projections, a pair of offset projections are formed into said cap portion underside in proximity to said support projections to seat said around said cap underside projections and to limit a range of radial displacement of said locking tabs between the locked and unlocked positions.

10. The assembly of claim 1, further comprising said cap portion and said unit each being constructed of at least one of a metal, a metal alloy, a fiberglass, a plastic, or a reinforced plastic composite.

11. A lockable assembly for a fuel filler pipe, comprising:
a unit fixedly mounted to the fuel filler pipe to define an access passageway within the filler pipe;
a cap portion engageable upon said unit to block the access passageway;
a key receiving portion incorporated within said cap portion, said key receiving portion communicating with a rotatable gear component arranged on an underside of said cap portion;
a pair of locking tabs which are radially displaced via a rotatable gear component so that said tabs displace in opposite directions, said locking tabs each having a plurality of extending teeth in meshing engagement with said gear component and, in response to rotation of said key receiving portion, causing said locking tab to displace between lock and unlock positions of said cap portion with said unit;
said cap portion further including a three dimensional disk shaped body with a main wall supporting at its outer periphery an outer annular and circumferential extending end wall;
said unit further including an underside annular rim edge and adjoining circumferential outer side wall, upon which are configured lateral projections opposing an inner circumferential surface locations of said cap portion when said cap portion is supported over said unit and so that, and upon displacing said locking tabs out of contact with said fuel filler pipe affixed unit, said cap portion can be axially removed to reveal the fuel filler pipe; and
an underside surface of said main wall of said cap portion including pairs of support projections for receiving and guidably supporting said locking tabs, said pairs of support projections each extending radially between an outside notched end defined in said outer end wall of said cap portion and a central located aperture in said main wall defining an interior location of said cap for mounting said key receiving portion and said rotatable component.

12. The assembly of claim 11, further comprising a bolt having a head and a threaded shaft approximating in cross section and dimension an outline of said central, said head integrating said key receiving portion in order to rotate a separate stem portion which extends from an end of said shaft.

13. The assembly of claim 12, said rotatable gear component further comprising a flattened outer perimeter and an inner supported teethed pattern, a screw seating through an interior aperture profile of said rotatable gear within its teethed pattern, said screw engaging opposing interior teeth configured within a recessed pattern within a projecting end of said stem portion.

14. A lockable assembly for a fuel filler pipe, comprising:
a unit fixedly mounted to the fuel filler pipe to define an access passageway within the filler pipe;
a cap portion engageable upon said unit to block the access passageway;
a key receiving portion incorporated within said cap portion, said key receiving portion communicating with a rotatable gear component arranged on an underside of said cap portion;
a pair of locking tabs which are radially displaced via a rotatable gear component so that said tabs displace in opposite directions, said locking tabs each further having a planar base portion from which extends a narrowed elongate extending portion, said base portion of each locking tab being dimensioned to seat within said cap portion;
said base portion of each locking tab being notched so that, upon seating said locking tabs into said cap portion underside located pairs of support projections, a pair of offset projections are formed into said cap portion underside in proximity to said support projections to seat said around said cap underside projections and to limit a range of radial displacement of said locking tabs between the locked and unlocked positions; and
said locking tabs each further having a plurality of extending teeth in meshing engagement with said gear component and, in response to rotation of said key receiving portion, causing said locking tab to displace between lock and unlock positions of said cap portion with said unit.

15. The assembly of claim 14, each of said locking tabs further comprising an angled end extending portion, each including notched opposite edges for seating additional alignment tabs associated with notched end wall surfaces defined in said cap portion.

16. The assembly of claim 15, said alignment tabs each further comprising a reverse and inwardly turned edge flange extending from a remote edge of said angled end extending portions which, in an inwardly retracted and locked position, abut against an underside annular rim edge of a side wall of said unit.

* * * * *